(12) United States Patent
Yamazaki et al.

(10) Patent No.: US 10,708,045 B2
(45) Date of Patent: Jul. 7, 2020

(54) CONFIDENTIAL INFORMATION SETTING METHOD, CONFIDENTIAL INFORMATION SETTING SYSTEM, AND CONFIDENTIAL INFORMATION SETTING APPARATUS

(71) Applicant: HITACHI, LTD., Tokyo (JP)

(72) Inventors: Hiroki Yamazaki, Tokyo (JP); Hiromi Isokawa, Tokyo (JP); Hiroyuki Higaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 15/744,084

(22) PCT Filed: Nov. 18, 2015

(86) PCT No.: PCT/JP2015/082436
§ 371 (c)(1),
(2) Date: Jan. 12, 2018

(87) PCT Pub. No.: WO2017/017862
PCT Pub. Date: Feb. 2, 2017

(65) Prior Publication Data
US 2018/0212765 A1    Jul. 26, 2018

(30) Foreign Application Priority Data
Jul. 29, 2015 (JP) .................. 2015-149136

(51) Int. Cl.
*H04L 9/08* (2006.01)
*G06F 21/60* (2013.01)
(Continued)

(52) U.S. Cl.
CPC .......... *H04L 9/0822* (2013.01); *G06F 21/60* (2013.01); *G06F 21/602* (2013.01);
(Continued)

(58) Field of Classification Search
CPC ... H04L 9/0822; H04L 63/061; H04L 9/0897; H04L 9/3263; H04L 9/3273;
(Continued)

(56) References Cited

U.S. PATENT DOCUMENTS 5,481,613 A    1/1996 Ford et al.
9,838,390 B2 * 12/2017 Zakaria .................. H04W 4/70
(Continued)

FOREIGN PATENT DOCUMENTS

EP    2 919 497 A1 * 9/2015 ............ H04W 12/02
JP    2009-277184 A    11/2009
(Continued)

OTHER PUBLICATIONS

Extended European Search Report received in corresponding European Application No. 15899694.2 dated Feb. 21, 2019.
(Continued)

*Primary Examiner* — Christopher A Revak
(74) *Attorney, Agent, or Firm* — Mattingly & Malur, PC

(57) ABSTRACT

A confidential information setting apparatus includes: a communication unit that acquires an encryption key and condition information, which is a condition for setting a secret key to a terminal, from a memory unit of a server and acquires a terminal ID, which is an identifier for uniquely identifying the terminal, and the secret key associated with the terminal ID and encrypted from a memory unit of a user apparatus; an encryption processing unit that decrypts the encrypted secret key with the encryption key; and a control unit that judges whether the decrypted secret key can be set to the terminal or not, based on the condition information and sets the secret key to the terminal when a result of the judgment indicates that the secret key can be set to the terminal.

7 Claims, 21 Drawing Sheets

(51) Int. Cl.
*H04L 29/06* (2006.01)
*H04L 9/32* (2006.01)
*H04W 12/00* (2009.01)
*H04W 12/04* (2009.01)

(52) U.S. Cl.
CPC .......... *H04L 9/0872* (2013.01); *H04L 9/0897* (2013.01); *H04L 9/3263* (2013.01); *H04L 9/3273* (2013.01); *H04L 63/061* (2013.01); *H04L 63/062* (2013.01); *H04L 63/0876* (2013.01); *H04W 12/005* (2019.01); *H04W 12/04031* (2019.01); *H04L 63/107* (2013.01); *H04L 63/108* (2013.01); *H04W 12/0051* (2019.01); *H04W 12/00502* (2019.01); *H04W 12/00503* (2019.01)

(58) Field of Classification Search
CPC ... H04L 63/107; H04L 63/108; H04L 9/0872; H04L 63/062; H04L 63/0876; G06F 21/602; G06F 21/60; H04W 12/005; H04W 12/04031; H04W 12/00502; H04W 12/0051; H04W 12/00503
See application file for complete search history.

(56) References Cited

U.S. PATENT DOCUMENTS

| | | | |
|---|---|---|---|
| 9,933,768 B2* | 4/2018 | Britt | G08C 17/02 |
| 10,135,678 B2* | 11/2018 | Chakrabarti | H04L 41/0806 |
| 2011/0113241 A1 | 5/2011 | Umezawa et al. | |
| 2012/0159156 A1 | 6/2012 | Barham et al. | |
| 2012/0159167 A1* | 6/2012 | Lee | H04L 9/321 |
| | | | 713/168 |
| 2013/0267164 A1 | 10/2013 | Kodama et al. | |
| 2014/0256285 A1* | 9/2014 | Koo | H04W 4/24 |
| | | | 455/406 |
| 2014/0317707 A1* | 10/2014 | Kim | H04W 12/04 |
| | | | 726/6 |
| 2014/0351591 A1 | 11/2014 | Kodama et al. | |
| 2015/0082023 A1 | 3/2015 | van Roermund et al. | |
| 2015/0163209 A1 | 6/2015 | Kawamoto et al. | |
| 2016/0173495 A1* | 6/2016 | Joo | H04L 63/08 |
| | | | 713/171 |
| 2016/0198536 A1* | 7/2016 | Britt | H05B 37/0272 |
| | | | 315/149 |
| 2016/0205078 A1* | 7/2016 | James | H04L 63/0442 |
| | | | 713/171 |
| 2016/0205097 A1* | 7/2016 | Yacoub | H04L 63/0876 |
| | | | 726/6 |
| 2017/0005820 A1* | 1/2017 | Zimmerman | H04L 67/10 |
| 2017/0295491 A1* | 10/2017 | Gehrmann | H04W 12/06 |
| 2017/0303067 A1* | 10/2017 | Ukkola | H04W 4/70 |
| 2017/0353859 A1* | 12/2017 | Idnani | H04W 12/08 |
| 2017/0359338 A1* | 12/2017 | Tschofenig | G06F 21/34 |
| 2018/0006829 A1* | 1/2018 | Kravitz | H04L 9/3255 |
| 2018/0184290 A1* | 6/2018 | Luo | H04L 63/166 |
| 2018/0338242 A1* | 11/2018 | Li | H04W 12/06 |
| 2019/0116087 A1* | 4/2019 | Hiller | H04L 67/12 |
| 2019/0207755 A1* | 7/2019 | Gu | G06F 21/602 |
| 2019/0239068 A1* | 8/2019 | Mudulodu | H04L 9/3226 |
| 2019/0245713 A1* | 8/2019 | Lo | G06K 7/10722 |

FOREIGN PATENT DOCUMENTS

| | | |
|---|---|---|
| JP | 2013-218532 A | 10/2013 |
| JP | 2014-503909 A | 2/2014 |
| JP | 2014-212512 A | 11/2014 |
| JP | 2014-230213 A | 12/2014 |

OTHER PUBLICATIONS

International Search Report of PCT/JP2015/082436 dated Feb. 16, 2016.

* cited by examiner

FIG.9
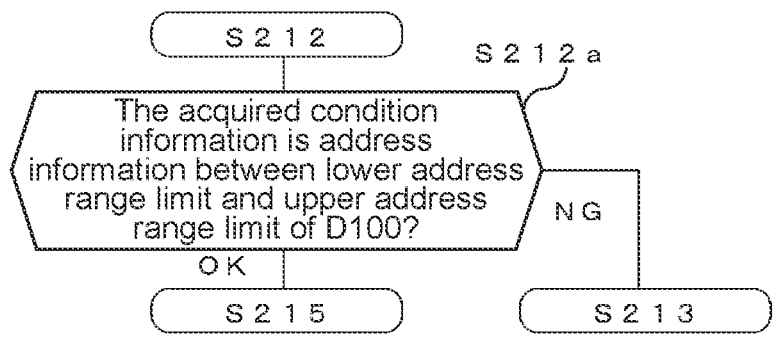
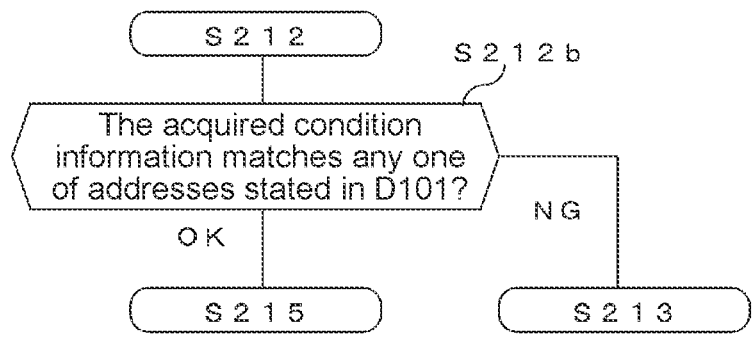
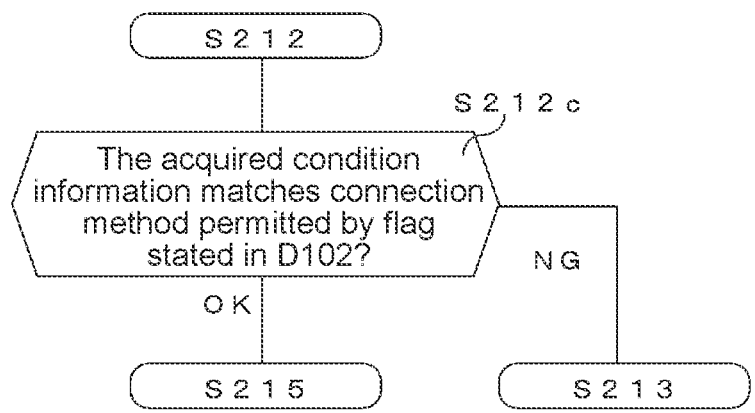

FIG.10
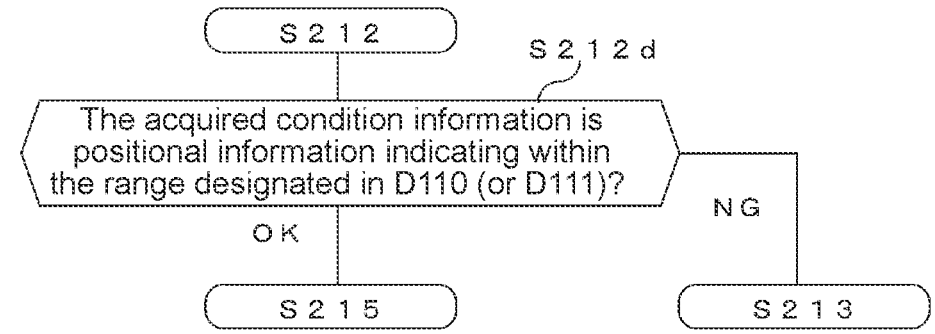
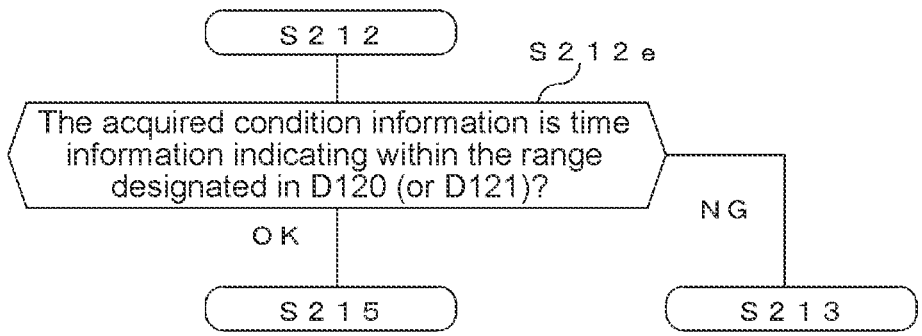
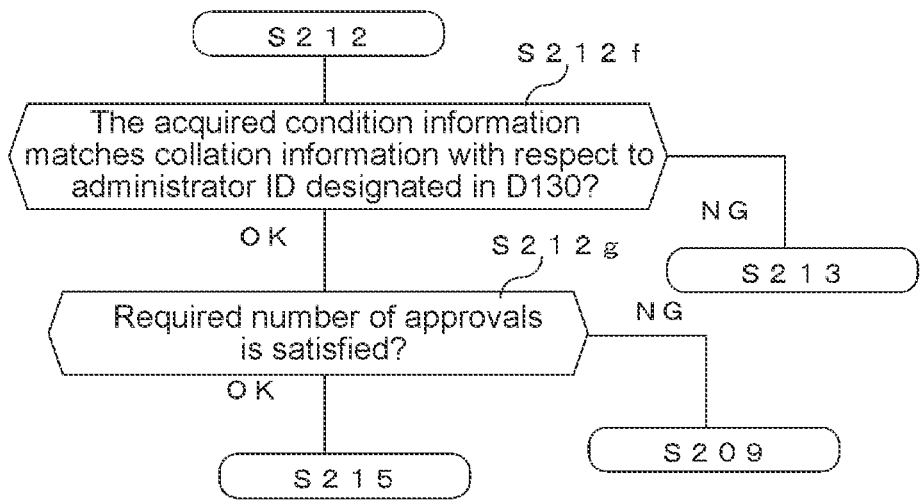

FIG.15

Memory Unit 11

| Control Software 1101 | Server Connection Information 1102 |

Condition Information ID Table 112

| F1000 | 「Terminal Connection Information」 |
|---|---|
| F1001 | 「Positional Information」 |
| F1002 | 「Time Information」 |
| F1003 | 「Authentication of Plural Administrators」 |
| F1004 | 「Terminal ID Input」 |
| . . . | . . . |

Information Storage Table 211

| Terminal ID 2110 | Terminal Secret Key 2117 | Condition Information ID 2114 | Condition Information 2115 | Log Information 2116 |
|---|---|---|---|---|
| XYZ | Certificate  Secret Key | C1000 | Terminal Connection Information | . . . |
|  |  | C1001 | Positional Information |  |
| UVW | Certificate  Secret Key | C1002 | Time Information | . . . |
| . . . |  |  |  |  |

Volatile Memory Unit 25

| Terminal ID Storage Unit 2501 |

Information Storage Table 411

| Terminal ID 4110 | Entry ID 4111 | Terminal Secret Key 4112 | Condition Information ID 4114 | Condition Information 4115 | Administrator ID 4116 |
|---|---|---|---|---|---|
| XYZ | ABCD 1234 | Certificate  Secret Key | C1000 | Terminal Connection Information | P123 |
|  |  |  | C1001 | Positional Information |  |
| UVW | EFGH 5678 | Certificate  Secret Key | C1002 | Time Information | P456 |
| . . . |  |  |  |  |  |

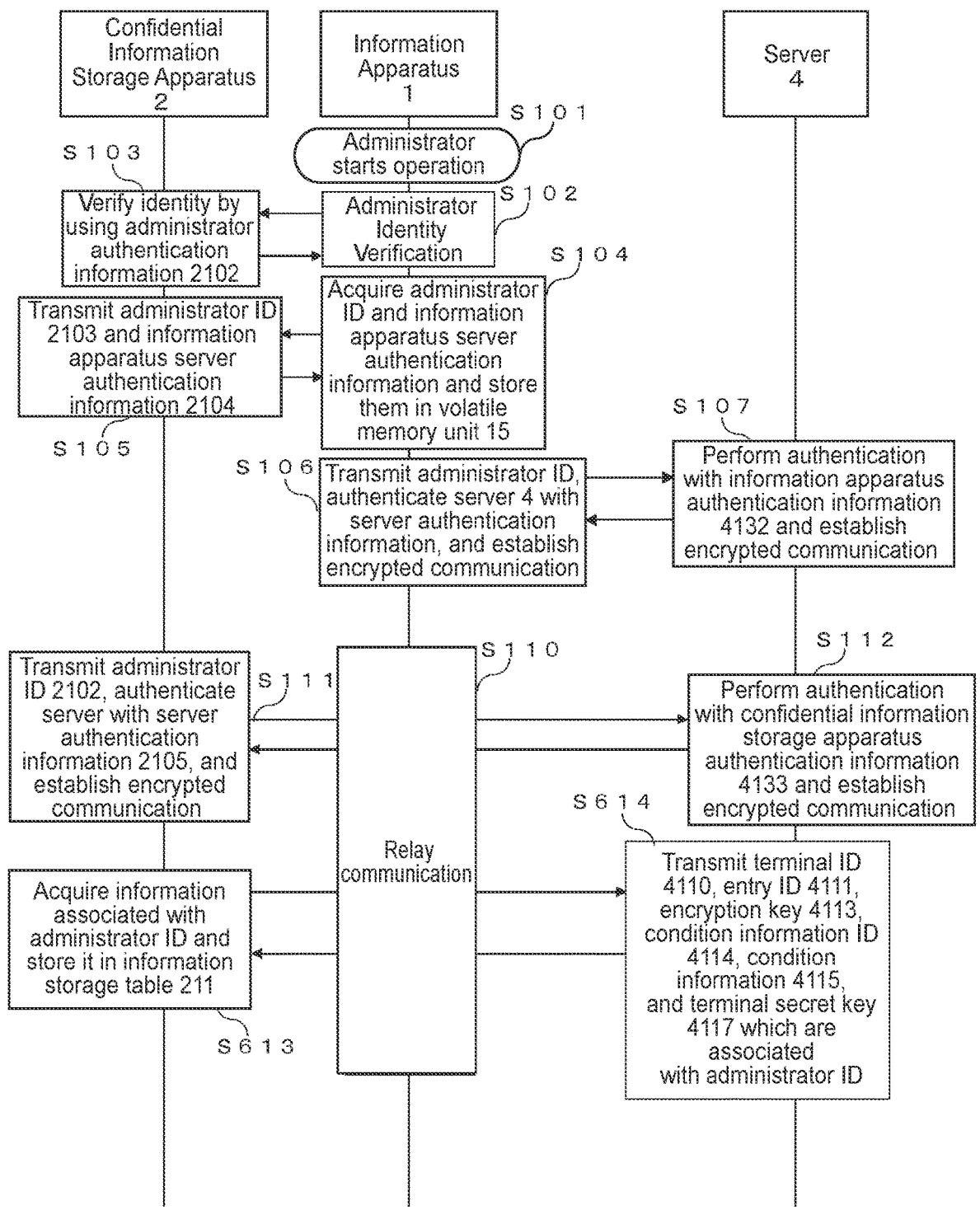

CONFIDENTIAL INFORMATION SETTING METHOD, CONFIDENTIAL INFORMATION SETTING SYSTEM, AND CONFIDENTIAL INFORMATION SETTING APPARATUS

TECHNICAL FIELD

The present invention relates to a method, system, and apparatus for setting confidential information.

BACKGROUND ART

PTL 1 discloses a method for transferring confidential information from a parent IC card to a child IC card by using public key encryption. Moreover, PTL 2 discloses a method for using a GPS location guaranteed by, for example, a kernel or a TPM (Trusted Platform Module) to verify the authority to execute an application in a PC.

CITATION LIST

Patent Literature

PTL 1: Japanese Patent Application Laid-Open (Kokai) Publication No. 2009-277184
PTL 2: Japanese Unexamined Patent Application Publication (Translation of PCT Application) No. 2014-503909

SUMMARY OF THE INVENTION

Problems to be Solved by the Invention

Along with the spread of M2M (Machine To Machine) and IoT (Internet of the Things) in recent years, various terminals such as on-board equipment and sensor nodes are being connected to servers or clouds via various networks. When these terminals are connected to the servers, it is sometimes required to perform authentication using certificates or the like including secret keys to enhance security. When importing these certificates into the terminals, it is necessary to authenticate the terminals. However, since there is a diversity of security functions and security operations of the terminals, there is a problem of difficulty in strict authentication in accordance with encryption technology.

PTL 1 is based on the premise that a receiving terminal has an initial key; and if the receiving terminal does not have the initial key, PTL 1 cannot be implemented. Moreover, according to PTL 2, positional information guaranteed by a TPM or the like is used to verify the authority to execute applications in a PC; however, PTL 2 does not disclose a method for using the positional information to distribute confidential information to other equipment.

So, the present invention provides a method, system, and apparatus for configuring an information system suited to prevent, for example, extraction of a certificate or import of the certificate into a non-target terminal and enhance security even when the security by strict terminal authentication cannot be achieved due to, for example, lack of the initial key.

Means to Solve the Problems

In order to solve the above-described problems, a confidential information setting apparatus according to the present invention includes: a communication unit that acquires an encryption key and condition information, which is a condition for setting a secret key to a terminal, from a memory unit of a server and acquires a terminal ID, which is an identifier for uniquely identifying the terminal, and the secret key associated with the terminal ID and encrypted from a memory unit of a user apparatus; an encryption processing unit that decrypts the encrypted secret key with the encryption key; and a control unit that judges whether the decrypted secret key can be set to the terminal or not, based on the condition information and sets the secret key to the terminal when a result of the judgment indicates that the secret key can be set to the terminal.

Advantageous Effects of the Invention

The security can be enhanced according to the present invention by using the condition information which serves as conditions to be complied with such as a setting position and setting time even when the security by strict terminal authentication cannot be achieved due to, for example, lack of the initial key.

BRIEF DESCRIPTION OF DRAWINGS

FIG. 9 is a diagram illustrating an example of processing of the information system;
FIG. 10 is a diagram illustrating an example of processing of the information system;
FIG. 15 is a diagram illustrating an example of a functional configuration of the information system;
FIG. 16 is a diagram illustrating an example of processing of the information system.

DESCRIPTION OF EMBODIMENTS

Embodiments according to the present invention will be explained below by using the drawings. Regarding an information system according the present invention, an explanation will be given about specific examples of a method for enhancing the security upon importing a certificate into a terminal even when a terminal does not have sufficient authentication information to achieve strict security.

Figure 1:
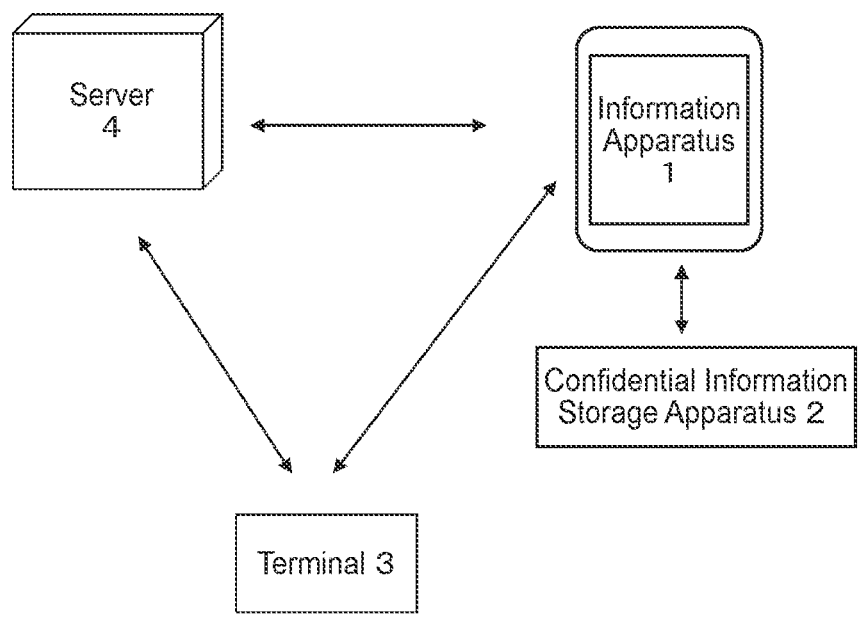
FIG. 1 is a diagram illustrating an example of an information system.

FIG. 1 is a diagram illustrating an example of an information system. Regarding the information system according to the present invention, an information apparatus 1, a terminal 3, and a server 4 are connected to each other via communication. Moreover, the information apparatus 1 and a confidential information storage apparatus 2 including a semiconductor device are connected to each other via communication. Incidentally, each apparatus may be connected via a path which is not illustrated in FIG. 1. Alternatively, it will be no problem if the information apparatus 1 is internally equipped with the confidential information storage apparatus 2. Furthermore, it will be no problem if any constituent element(s) other than those illustrated in the drawing is included. For example, a server or the like for communicating with the terminal 3 may be included in order to implement specified IoT services.

The information apparatus 1 is a terminal that: has, for example, a display function capable of displaying information, an input function capable of inputting the information, a communication function capable of communicating with other apparatuses and equipment, and a control function capable of arithmetic operations of the information; and mainly serves a role to intermediate inputs from a user and communication between equipment. Moreover, this information system may include a plurality of information apparatuses 1. Possible examples of the information apparatus 1 may include a PC, a smartphone, a tablet terminal, and a wearable terminal; however, the examples of the information apparatus 1 are not limited to those listed above.

The confidential information storage apparatus 2 is an apparatus including a secure semiconductor device equipped with, for example, a tamper resistant mechanism. The confidential information storage apparatus 2 includes, for example, a communication unit capable of communicating with other apparatuses and equipment, a control unit capable of arithmetic operations of information, and an encryption operation unit capable of high-speed encryption processing and mainly exchanges information with the information apparatus 1. Possible forms of the confidential information storage apparatus 2 include devices in a form to be inserted into the information apparatus 1, non-contact-type or contact-type IC cards, SIM-card-type IC cards, microSD-type IC cards, embedded-chip-type IC cards, and TPM (Trusted Platform Module); however, the possible forms of the confidential information storage apparatus 2 are not limited to those listed above. Alternatively, the confidential information storage apparatus 2 is integrated with the information apparatus 1 and a control unit or a semiconductor device itself may be shared with them. The information system may include a plurality of confidential information storage apparatuses 2 or one information apparatus 1 may communicate with the plurality of confidential information storage apparatuses 2.

The terminal 3 is a terminal that communicates with other terminals, apparatuses, servers, and so on via a network or the like in order to provide services via M2M (Machine to Machine) or IoT (Internet of Things). The terminal 3 sets authentication information to communicate with other servers or the like by communicating with the information apparatus 1. The terminal 3 is, for example, a sensor node equipped with sensors or the like, M2M equipment for implementing M2M, or an onboard device which is mounted in a vehicle. The terminal 3 implements a specified security function by including, for example, specified authentication means and encryption means for transmitting data externally.

The server 4 is a server that communicates with the information apparatus 1, the terminal 3, other servers, and so on via a network or the like. The server 4 is a server that safely stores public key certificates of PKI (Public Key Infrastructure) and secret keys. The server 4 may be configured so that other applications may operate or the functions may be divided into a plurality of servers or housings such as storage units and the servers or housings may then be combined. Furthermore, for example, information equipment capable of similar processing may be used without limitation to the server.

The communication between the information apparatus 1 and the confidential information storage apparatus 2 may possibly be, for example, wired or wireless communication such as communication according to ISO7816 which is an international standard communication mode for contact IC cards, ISO14443 which is an international standard communication mode for non-contact IC cards, NFC (Near Field Communication), and communication according to FeliCa (registered trademark), USB (Universal Serial Bus), and SD card standards, Bluetooth (registered trademark), Bluetooth (registered trademark) Low Energy, wired LAN (Local Area Network), wireless LAN, Zigbee (registered trademark), and TransferJET (registered trademark). Alternatively, for example, wire-bound connections on a substrate may be used.

The communication between the information apparatus 1 and the terminal 3 may possibly be, for example, wired or wireless communication such as communication according to USB, NFC, and SD card standards, Bluetooth (registered trademark), Bluetooth (registered trademark) Low Energy, wired LAN, wireless LAN, Zigbee (registered trademark), TransferJET, ISO7816 which is an international standard communication mode for contact IC cards, and ISO14443, FeliCa, and RS-232C which are international standard communication modes for non-contact IC cards.

The communication between the information apparatus 1 and the server 4 and the communication between the terminal 3 and the server 4 may possibly be, for example, wireless communication such as LTE (Long Term Evolution), 3G (3rd Generation), WiMAX (Worldwide Interoperability for Microwave Access), wireless LAN, and WAN (Wide Area Network) or wired communication such as wired LAN, the Internet, and communication using dedicated lines.

It will be no problem if these communications are respectively separate communication networks or are the same network.

Figure 2:
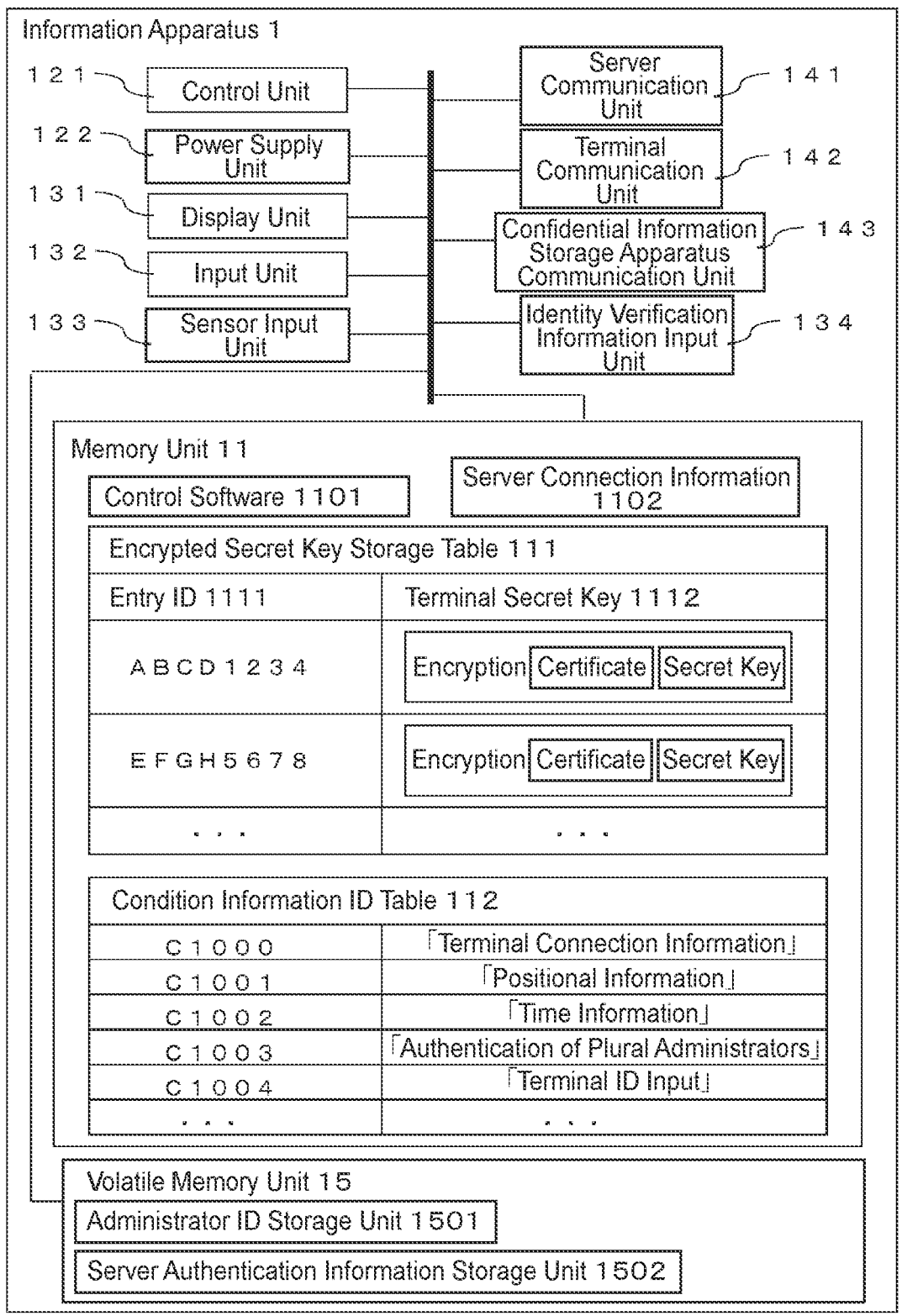
FIG. 2 is a diagram illustrating an example of a functional configuration of the information apparatus.

FIG. 2 is a diagram illustrating an example of a functional configuration of the information apparatus 1.

The information apparatus 1 includes a memory unit 11, a control unit 121, a power supply unit 122, a display unit 131, an input unit 132, a sensor input unit 133, an identity verification information input unit 134, a server communication unit 141, a terminal communication unit 142, a confidential information storage apparatus communication unit 143, and a volatile memory unit 15 and these units are connected with bus lines or the like. Incidentally, FIG. 2 shows as if each module were physically connected to other modules inside the information apparatus 1; however, the modules do not necessarily have to be connected with bus lines, but may be electrically connected by other means or the information apparatus 1 may be configured so that only necessary modules may be connected to each other.

The memory unit 11 is composed of, for example, a magnetic disk, SSD (Solid State Drive), EEPROM, flash memory, and so on or is partly composed of a ROM (Read Only Memory) and so on and stores various kinds of information. The content stored in the memory unit 11 is retained even in a state of no power supply from the power supply unit 122. The memory unit 11 stores, for example, operation control programs to be executed by the control unit 121 and necessary data for processing. Constituent elements included by the memory unit 11 will be explained later.

The control unit 121 is composed of a CPU, an MPU, a DSP, and so on and controls the operation of the entire information apparatus 1 by, for example, executing specified operation control programs.

The power supply unit 122 is composed of a battery, an AC adapter, a charging circuit, and so on, supplies power to each unit of the information apparatus 1, and charges batteries. The power supply unit 122 may supply power to the confidential information storage apparatus 2 and such power supply may be conducted via the confidential information storage apparatus communication unit 143.

The display unit 131 is composed of, for example, a panel such as a liquid crystal display, an organic EL display, or electronic paper, and a driver circuit and displays arbitrary information (for example, characters, still images, and moving images) under the control of the control unit 121. The display unit 131 may include a plurality of display devices, each of which displays different information.

The input unit 132 includes, for example, one or more touch panels, buttons, keyboards, mice, cursor keys, and numeric keypads, accepts operations by a user, and inputs an input signal based on the operations to the control unit 121. Incidentally, the input unit 132 may be configured so that the display unit 131 is integrated with the input unit 132 like a touch panel. Furthermore, the input signal may be generated by means of, for example, voice recognition, image recognition, or gesture recognition and the generated input signal may be input to the control unit 121.

The sensor input unit 133 acquires specified information from outside or inside the information apparatus 1 and inputs it as an electric signal to the control unit 121. The sensor input unit 133 is a device such as a GPS, wireless LAN, or Bluetooth (registered trademark) for acquiring positional information, an image pickup device for capturing images, a microphone for acquiring voices, a device for managing time of the information apparatus 1 or acquiring time from outside, various sensors such as a temperature sensor, a strain sensor, an acceleration sensor, and a fine particle sensor, an input device such as a keypad or a touchpad, and a device for acquiring biological information, or a combination of the above-listed devices. The sensor input unit 133 may be a common device shared with the input unit 132, the identity verification information input unit 134, the power supply unit 122, the server communication unit 141, the terminal communication unit 142, the confidential information storage apparatus communication unit 143, or other modules. A signature or the like for confirming validity of information may be assigned to the information acquired from the sensor input unit 133. Reference is made to the information, which is acquired by the sensor input unit 133, as condition information upon setting of a terminal secret key to the terminal 3 in a flow described later.

The identity verification information input unit 134 is a device for acquiring images and voice signals of one or more pieces of biological information such as veins, fingerprints, palms of hands, irises, voices, and faces, or data of characteristics extracted from the above-listed biological information, or a keypad, touchpad, or keyboard into which a password or a PIN number is input. The identity verification information input unit 134 may be configured so that it is integrated with the input unit 132. The identity verification information input unit 134 may start the operation to acquire the data as it detects the existence of an organism; or may start the operation to acquire the data as triggered by input by the input unit 132. A plurality of identity verification information input units 134 may exist in the information apparatus 1.

The server communication unit 141 is a function that makes the information apparatus 1 communicate with, for example, the server 4, and is a module for performing wireless communication such as LTE, 3G, WiMAX, wireless LAN, and WAN or communication using wired LAN, the Internet, and dedicated lines. A plurality of server communication units 141 may exist in the information apparatus 1 according to, for example, communication modes. Moreover, the server communication unit 141 may be shared and used with other modules for performing communication.

The terminal communication unit 142 is a function that makes the information apparatus 1 communicate with, for example, the terminal 3, and is a module for performing communication such as Bluetooth (registered trademark), NFC, Zigbee (registered trademark), USB, RS-232C, wired LAN, wireless LAN, Zigbee (registered trademark), and TransferJET. As for other communication modes, the modes are not limited to those listed above as long as the communication is performed to connect devices. The terminal communication unit 142 may be the same module as the server communication unit 141 or the confidential information storage apparatus communication unit 143. A plurality of terminal communication units 142 may exist in the information apparatus 1 according to, for example, the communication modes.

The confidential information storage apparatus communication unit 143 is a function that makes the information apparatus 1 communicate with the confidential information storage apparatus 2, and is a module for implementing communication modes such as ISO7816 which is an international standard communication mode for contact IC cards, ISO14443, FeliCa, and NFC which are international standard communication modes for non-contact IC cards, communication according to SD card standards, Bluetooth (registered trademark), USB, wired LAN, wireless LAN, Zigbee (registered trademark), and TransferJET. The confidential information storage apparatus communication unit 143 may be the same module as other communication units. Furthermore, when the confidential information storage apparatus 2 is a module incorporated into the information apparatus 1, it may be connected via wiring on a substrate or the like. Alternatively, when the information apparatus 1 is integrated with the confidential information storage apparatus 2 and a function corresponding to the confidential information storage apparatus 2 is a confidential information protection mechanism of the information apparatus 1, it will be no problem if a specified API (Application Programming Interface) for the confidential information protection mechanism of the information apparatus 1 is considered to be the confidential information storage apparatus communication unit 143. A plurality of confidential information storage apparatus communication units 143 may exist in the information apparatus 1 according to the communication modes or the number of the confidential information storage apparatuses 2.

Incidentally, when the communication functions of the server communication unit 141, the terminal communication unit 142, the confidential information storage apparatus communication unit 143, and so on are wireless communication, they may include an antenna(s), a modulator-demodulator circuit(s), and so on. On the other hand, when they are wired communication, they may include a connector(s), a modulator-demodulator circuit(s), and so on. Each of the server communication unit 141, the terminal communication unit 142, and the confidential information storage apparatus communication unit 143 may be configured so that it may adapt itself to a plurality of communication modes.

The volatile memory unit 15 is composed of a semiconductor memory or the like built in the information apparatus 1 and stores various kinds of information. The volatile memory unit 15 is composed of, for example, a RAM memory and its stored content is destroyed when the power is no longer supplied from the power supply unit 122. The volatile memory unit 15 stores, for example, data which is temporarily necessary for processing. Constituent elements of the volatile memory unit 15 will be explained later.

The memory unit 11 includes control software 1101, server connection information 1102, an encrypted secret key storage table 111, and a condition information ID table 112. The memory unit 11 may include other constituent elements than those listed above.

The control software 1101 has software described therein for controlling the information apparatus 1. The control software 1101 is software for executing a sequence of processing flows by means of input from the input unit 132, communication from the server communication unit 141, communication from the terminal communication unit 142, communication from the confidential information storage apparatus communication unit 143, or a specified timer or other interruption processing. The control software 1101 may be of a composite type which is a plurality of pieces of software in collaboration. Incidentally, if it is described in this example without any particular explanation as if the information apparatus 1 or the control software 1101 executes the processing, it means that physically the control unit 121 executes the processing in accordance with the description of the relevant program of the control software 1101.

The server connection information 1102 is necessary information for the information apparatus 1 to connect to the server 4. For example, the server connection information 1102 is a URL of the server 4. The server connection information 1102 may be composite information including other information.

The encrypted secret key storage table 111 is a constituent element for retaining a terminal secret key encrypted by the server 4 and is composed of a database, a hash table, and so on. The encrypted secret key storage table 111 includes an entry ID 1111 and a terminal secret key 1112 as elements of the table. The entry ID stored in the entry ID 1111 is ID information for uniquely identifying the terminal secret key in the information system and adequate numbers and character strings are described as the ID information. The column for the terminal secret key 1112 stores the encrypted terminal secret key associated with the entry ID. The terminal secret key is information to be set to the terminal 3 in a flow described later. For example, such information is a set of a secret key of public key encryption and a public key certificate or a secret key of common key encryption. The terminal secret key is encrypted by the server 4 by a specified method and is associated with the entry ID 1111 and then stored. The drawing illustrates an example of the encrypted secret key storage table 111; however, a data format, the number of pieces of data, and the content of the data are not limited to those illustrated in this example.

The condition information ID table 112 is a constituent element for storing a condition information ID indicative of a type of information acquired by, for example, the sensor input unit 133 and is composed of a database, a hash table, and so on. Referring to FIG. 2, "terminal connection information" is associated with the condition information ID "C1000" as an example. The terminal connection information is information indicative of a method of connecting the terminal 3 to the information apparatus 1 and is, for example, a unique ID of the terminal which is used for the communication mode or the communication and acquired from the terminal communication unit 142. Moreover, "positional information" is associated with the condition information ID "C1001." The positional information may possibly be acquired from the sensor input unit 133 or the terminal 3. Furthermore, "time information" is associated with the condition information ID "C1002." The time information may be acquired from the sensor input unit 133, the control unit 121, or each communication unit. For example, the time information may be acquired from the server 4 via the server communication unit 141. Furthermore, "authentication of plural administrators" is associated with the condition information ID "C1003." The authentication of plural administrators indicates that the authentication of one or more administrators in addition to the user who operates the information apparatus 1 is required, and identity verification information of other administrators may possibly be acquired via the identity verification information input unit 134 and the input unit 132. Under this circumstance, passwords, PIN, biological template information, and so on of the other administrators may be stored in the confidential information storage apparatus 2. Furthermore, "terminal ID input" is associated with the condition information ID "C1004." The terminal ID input indicates that the user inputs the ID, which is attached to, for example, a housing for the terminal 3, via the input unit 132, the sensor input unit 133, etc. Possible input methods may include input by a keypad, a touchpad, or a keyboard, input by capturing images, input by reading a bar code, a two-dimensional code, or an RFID tag, or input by voice. The details of the condition information will be explained later with reference to FIG. 8.

The condition information ID defined by the condition information ID table 112 is not limited to the definitions described above and is the ID indicative of a type of information acquired by the information apparatus 1 from its surroundings and retained inside the information apparatus 1 and may be any information as long as it is the type of information that is input from a specified module or by the user or from external equipment by means of inputs and outputs by having the control unit 121 designate the timing to acquire the information.

The volatile memory unit 15 includes an administrator ID storage unit 1501 and a server authentication information storage unit 1502. The volatile memory unit 15 may include other constituent elements than those listed above.

The administrator ID storage unit 1501 is a constituent element for storing an administrator ID which is an ID of a user who is an administrator operating the information apparatus 1. The administrator ID is uniquely defined for each user in the entire information system and is composed of numbers, a character string, binary data, etc. The administrator ID may be composite information including other information. In a later explanation of a processing flow, the administrator ID is acquired from the confidential information storage apparatus 2, but it may be retained in the memory unit 11. Under this circumstance, the configuration of the administrator ID storage unit 1501 may be omitted.

The server authentication information storage unit 1502 is a constituent element for temporarily storing server authentication information to execute processing for authenticating the server 4. The information apparatus 1 is authenticated mutually with the server 4 by using the server authentication information and encrypted communication is established between the information apparatus 1 and the server 4. In a later explanation of a processing flow, the server authentication information is acquired from the confidential information storage apparatus 2, but a part or whole of the server authentication information may be retained in the memory unit 11. Under this circumstance, the configuration of the server authentication information storage unit 1502 may be omitted. The server authentication information 1502 is necessary information for server authentication or client authentication, or both of them, to perform SSL or TLS communication with the server 4. Not all pieces of the server authentication information stored in the server authentication information storage unit 1502 have to be always acquired from the confidential information storage apparatus 2. Specifically speaking, when the server authentication information storage unit 1502 stores composite information including, for example, the secret key, it is unnecessary to take out the secret key. Furthermore, regarding the server authentication information stored in the server authentication information storage unit 1502, necessary information may be acquired from the server 4 or other servers as necessary.

Figure 3:
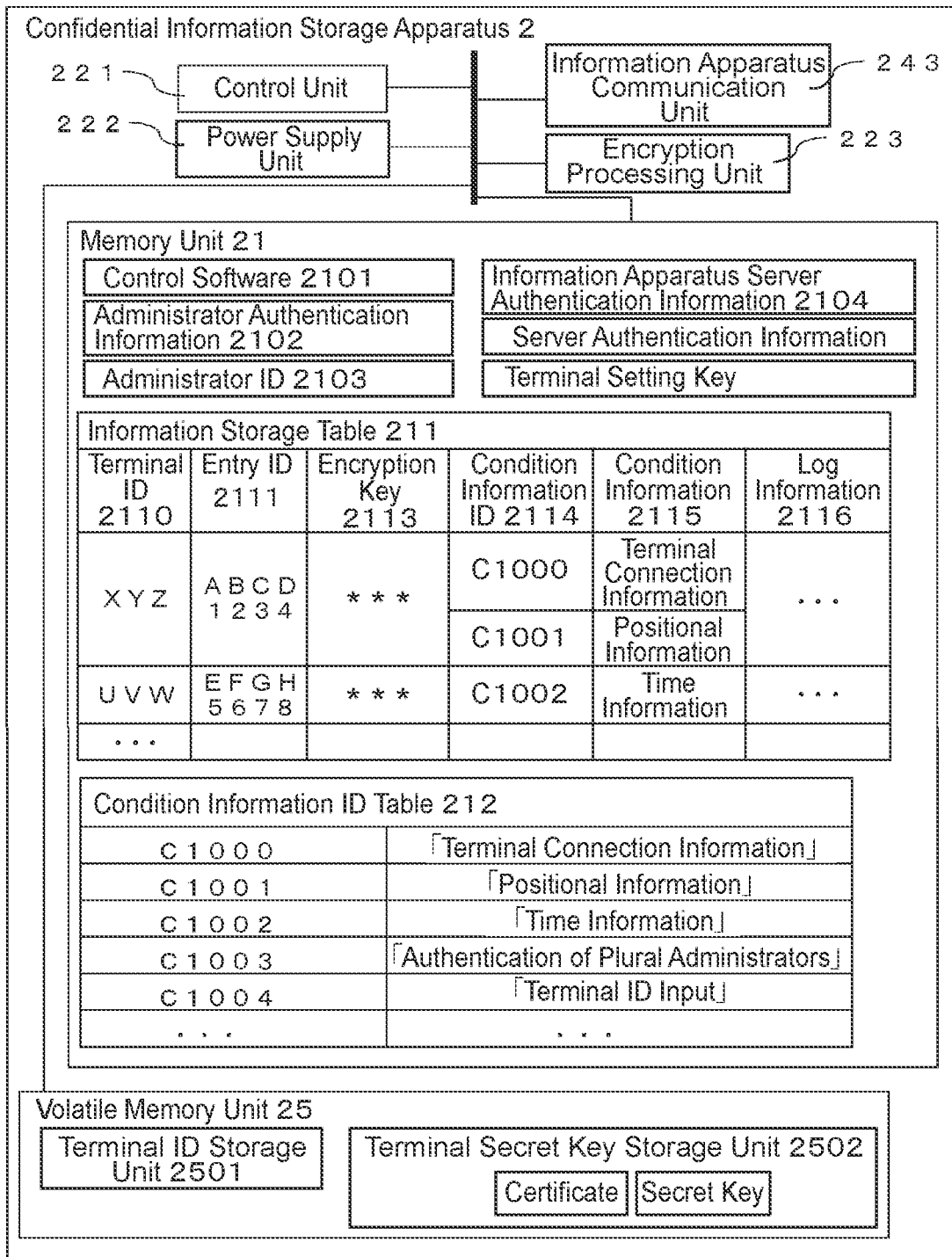
FIG. 3 is a diagram illustrating an example of a functional configuration of a confidential information storage apparatus.

FIG. 3 is a diagram illustrating an example of a functional configuration of the confidential information storage apparatus 2.

The confidential information storage apparatus 2 includes a memory unit 21, a control unit 221, a power supply unit 222, an encryption processing unit 223, an information apparatus communication unit 243, and a volatile memory unit 25 and these units are connected with bus lines or the like. Incidentally, FIG. 3 shows as if each module were physically connected to other modules inside the confidential information storage apparatus 2; however, the modules do not necessarily have to be connected with bus lines, but may be electrically connected by other means or the confidential information storage apparatus 2 may be configured so that only necessary modules may be connected to each other.

The memory unit 21 is composed of, for example, an EEPROM, flash memory, and so on or is partly composed of a ROM and so on and stores various kinds of information. Alternatively, the memory unit 21 may be composed of a magnetic disk, SSD, and so on. The content stored in the memory unit 21 is retained even in a state of no power supply from the power supply unit 222. The memory unit 21 stores, for example, operation control programs to be executed by the control unit 221 and necessary data for processing. Constituent elements included by the memory unit 21 will be explained later.

The control unit 221 is composed of a CPU, an MPU, a DSP, and so on and controls the operation of the entire confidential information storage apparatus 2 by, for example, executing specified operation control programs.

The power supply unit 222 is composed of a power supply terminal or antenna for acquiring power from outside, a power supply circuit, and so on and supplies power to each unit of the confidential information storage apparatus 2. Alternatively, the power supply unit 222 may include a battery, an AC adapter, a charging circuit, and so on. Although it is not shown in FIG. 3, the confidential information storage apparatus 2 may receive power supplied from the information apparatus 1 by the power supply unit 222; and under such circumstance, the power supply may be conducted via the information apparatus communication unit 243.

The encryption processing unit 223 is composed of a modular multiplication coprocessor, an encryption accelerator, and so on and is a processing unit to execute public key encryption processing such as RSA encryption or elliptic curve cryptography and common key encryption processing such as AES or DES at high speeds. A plurality of encryption processing units 223 may exist in the confidential information storage apparatus 2 according to, for example, the encryption to be processed.

The information apparatus communication unit 243 is a function that makes the confidential information storage apparatus 2 communicate with the information apparatus 1. The information apparatus communication unit 243 is a module for implementing communication modes such as ISO7816 which is an international standard communication mode for contact IC cards, ISO14443, FeliCa, and NFC which are international standard communication modes for non-contact IC cards, communication according to SD card standards, Bluetooth (registered trademark), USB, wired LAN, wireless LAN, Zigbee (registered trademark), and TransferJET. When the confidential information storage apparatus 2 is a module incorporated into the information apparatus 1, it may be connected via wiring on a substrate or the like. When the information apparatus 1 is integrated with the confidential information storage apparatus 2 and a function corresponding to the confidential information storage apparatus 2 is a confidential information protection mechanism of the information apparatus 1, it will be no problem if a specified API (Application Programming Interface) for the confidential information protection mechanism of the information apparatus 1 is considered to be the confidential information storage apparatus communication unit 243. A plurality of confidential information storage apparatus communication units 143 may exist in the confidential information storage apparatus 2 according to the communication modes.

Incidentally, in case of wireless communication, the communication function of, for example, the information apparatus communication unit 243 may include an antenna, a modulator-demodulator circuit, and so on. In a case of wired communication, the communication function may include a connector, a modulator-demodulator circuit, and so on. Each information apparatus communication unit 243 may be configured so that it may adapt itself to a plurality of communication modes.

The volatile memory unit 25 is composed of a semiconductor memory or the like built in the confidential information storage apparatus 2 and stores various kinds of information. The volatile memory unit 25 is composed of, for example, a RAM memory or the like and its stored content is destroyed when the power is no longer supplied from the power supply unit 222. The volatile memory unit 25 stores, for example, data which is temporarily necessary for processing. Constituent elements of the volatile memory unit 25 will be explained later.

The memory unit 21 includes control software 2101, administrator authentication information 2102, an administrator ID 2103, information apparatus server authentication information 2104, server authentication information 2105, a terminal setting key 2106, an information storage table 211, and a condition information ID table 212. The memory unit 21 may include other constituent elements than those listed above.

The control software 2101 has software described therein for controlling the confidential information storage apparatus 2 and is software for executing a sequence of processing flows by means of communication from the confidential information storage apparatus communication unit 243, or a specified timer or other interruption processing. The control software 2101 may be of a composite type which is a plurality of pieces of software in collaboration. Incidentally, if it is described in this example without any particular explanation as if the confidential information storage apparatus 2 or the control software 2101 executes the processing, it means that physically the control unit 221 executes the processing in accordance with the description of the relevant program of the control software 2101.

The administrator authentication information 2102 is reference information to perform identity verification of the administrator and includes, for example, a password, PIN, a biological information template, and so on. Whether the relevant person is the administrator himself/herself or not is verified by acquiring information for the identity verification via the information apparatus communication unit 243 and comparing it with the reference information stored in the administrator authentication information 2102.

The administrator ID 2103 is an administrator ID indicative of an ID of a user who is the administrator operating the information apparatus 1. The administrator ID is uniquely defined for each user in the entire information system and is composed of, for example, numbers, a character string, binary data, and so on. The administrator ID may be composite information including other information.

The information apparatus server authentication information 2104 is information for the information apparatus 1 together with the server 4 to execute authentication processing and the information apparatus 1 authenticates the server 4 mutually by using the server authentication information and establishes the encrypted communication between the information apparatus 1 and the server 4. When the information apparatus 1 retains the server authentication information, the configuration of the information apparatus server authentication information 2104 may be omitted. The information apparatus server authentication information 2104 is necessary information for server authentication or client authentication, or both of them, for the information apparatus 1 and the server 4 to perform SSL or TLS communication. Not all pieces of the information apparatus server authentication information 2104 have to be always transmitted to the information apparatus 1; and when the server authentication information storage unit 1502 stores composite information including, for example, the secret key, it is unnecessary to send out the secret key. When some or all pieces of the information apparatus server authentication information 2104 is transmitted from the information apparatus communication unit 243, they are sent out after the identity verification using the administrator authentication information 2102 succeeds.

The server authentication information 2105 is information for the confidential information storage apparatus 2 to execute the authentication processing with the server 4. The confidential information storage apparatus 2 authenticates the server 4 mutually by using the server authentication information 2105 and establishes the encrypted communication with the server 4. The server authentication information 2105 is necessary information for server authentication or client authentication, or both of them, for the information apparatus 1 and the server 4 to perform SSL or TLS communication. Alternatively, the server authentication information 2105 is, for example, a necessary encryption key for authentication by the common key encryption.

The terminal setting key 2106 is an encryption key for setting the terminal secret key to the terminal 3. A plurality of configuration examples of the terminal setting key 2106 may be possible according to security levels of the terminal 3. For example, the terminal setting key 2106 may be the public key encryption such as RSA or the elliptic curve cryptography. Incidentally, when the terminal setting key 2106 is based on the public key encryption and the terminal 3 has a function that verifies a public key certificate of the terminal setting key 2106, the public key certificate for verification may be retained in the terminal setting key 2106 and transmitted to the terminal 3. When the terminal 3 has a mutual authentication function, a method for verifying the secret key of the terminal 3 may be retained in the memory unit 21. The terminal setting key 2106 may retain information such as an encryption key of the common key encryption or a public key certificate which is necessary for authentication processing by PKI based on the public key encryption.

The information storage table 211 is a constituent element for retaining information acquired from the server 4 and stores information to perform a specified condition judgment and then decrypt the terminal secret key 1112 acquired from the information apparatus 1. The information storage table 211 is composed of a database, a hash table, and so on.

The information storage table 211 includes a terminal ID 2110, an entry ID 2111, an encryption key 2113, a condition information ID 2114, condition information 2115, and log information 2116 as elements of the table.

The terminal ID stored in the terminal ID 2110 is ID information associated with the terminal 3 and is adequate numbers and character strings. Alternatively, the terminal ID is MAC addresses of the terminal 3 and the information apparatus 1 or numbers which are input to the information apparatus 1 by the user.

The entry ID stored in the entry ID 2111 is ID information capable of uniquely identifying the terminal secret key in the information system and is adequate numbers and character strings.

The encryption key 2113 is an encryption key for decrypting the terminal secret key encrypted by the server 4 and is associated with the entry ID 2111. The encryption key 2113 is an encryption key for, for example, the common key encryption such as AES.

The condition information ID 2114 is information indicative of a type of information acquired by, for example, the sensor input unit 133 of the information apparatus 1 and is associated with the entry ID 2111. A plurality of condition information IDs may be associated with one entry ID. FIG. 3 includes and illustrates an example where two condition information IDs "C1000" and "C1001" are associated with the entry ID "ABCD1234."

The condition information 2115 stores condition information to verify the condition information, which has been acquired by the information apparatus 1 and received via the information apparatus communication unit 243, by a specified method. In a processing flow explained later, the control unit 221 judges whether the condition information received from the information apparatus 1 is reasonable or not, by referring to, and verifying, the condition information stored in the condition information 2115.

The log information 2116: is a constituent element for storing a log when the terminal secret key associated with the entry ID 2111 is set to the terminal 3; and stores information such as time acquired from inside the confidential information storage apparatus 2 or from the information apparatus 1, a history of processing by the control software 2101, and so on.

In the example of FIG. 3, for example, when the condition information ID 2114 is C1000, the condition information 2115 stores a communication mode and a unique ID of the terminal or its range information which are acquired, as terminal connection information, from the terminal communication unit 142. The control unit 221 verifies, for example, whether the given terminal connection information is equal to the specified ID or not or whether it is within a specified range or not; and when the verification succeeds, the control unit 221 determines that the given condition information is reasonable.

Furthermore, when the condition information ID 2114 is C1001, the condition information 2115 stores, for example, information about a certain position or its range information as positional information. The control unit 221 verifies, for example, whether the given positional information is equal to a specified position or not, or whether it is within a specified range or not; and when the verification succeeds, the control unit 221 determines that the given condition information is reasonable.

Furthermore, when the condition information ID 2114 is C1002, the condition information 2115 stores, for example, information about certain time or its range information as time information. The control unit 221 verifies, for example, whether the given time information is equal to specified time or not or whether it is within a specified range or not; and when the verification succeeds, the control unit 221 determines that the given condition information is reasonable.

Furthermore, when the condition information ID 2114 is C1003, the condition information 2115 stores, for example, ID information of a plurality of administrators, a list thereof, or its range information. The control unit 221 verifies, for example, whether a given administrator ID is included in the list or not, or whether it is within a specified range or not; and when the verification succeeds, the control unit 221 determines that the given condition information is reasonable.

Furthermore, when the condition information ID 2114 is C1004, the condition information 2115 stores ID information assigned to a housing, etc. of the terminal as the terminal ID, ID information input by the user, information of a bar code or a two-dimensional code, ID information stored in an RFID tag, a template for images to be captured, a template for voices, and so on. These may be information indicative of a specific ID or include a specified range. The control unit 211 verifies, for example, whether the given ID information is equal to specified condition information or not, or whether it is within a specified range or not; and when the verification succeeds, the control unit 221 may possibly determine that the given condition information is reasonable.

The condition information ID table 212 is a constituent element for storing condition information IDs indicative of types of conditions acquired by, for example, the sensor input unit 133 of the information apparatus 1 and is composed of a database, a hash table, and so on. Specific examples indicated in FIG. 3 are the same as those described in the condition information ID table 112, so that an explanation about them has been omitted.

The volatile memory unit 25 includes a terminal ID storage unit 2501 and a terminal secret key storage unit 2502. The volatile memory unit 25 may include other constituent elements than those listed above.

The terminal ID storage unit 2501 is a constituent element for storing a terminal ID which is ID information associated with the terminal 3. The terminal ID is adequate numbers and character strings. Alternatively, the terminal ID is a MAC address of the terminal 3 when communicating with the information apparatus 1, or numbers which are input to the information apparatus 1 by the user. The terminal ID is acquired from the information apparatus 1 through the information apparatus communication unit 243.

The terminal secret key storage unit 2502 is a constituent element for storing the terminal secret key to be set to the terminal 3. The terminal secret key to be stored is the encrypted terminal secret key which is stored in the encrypted secret key storage table 111 of the information apparatus 1 and is acquired via the information apparatus communication unit 243, and on which decryption processing is executed inside the confidential information storage apparatus 2. The details will be explained later in the description of the processing flow.

Figure 4:
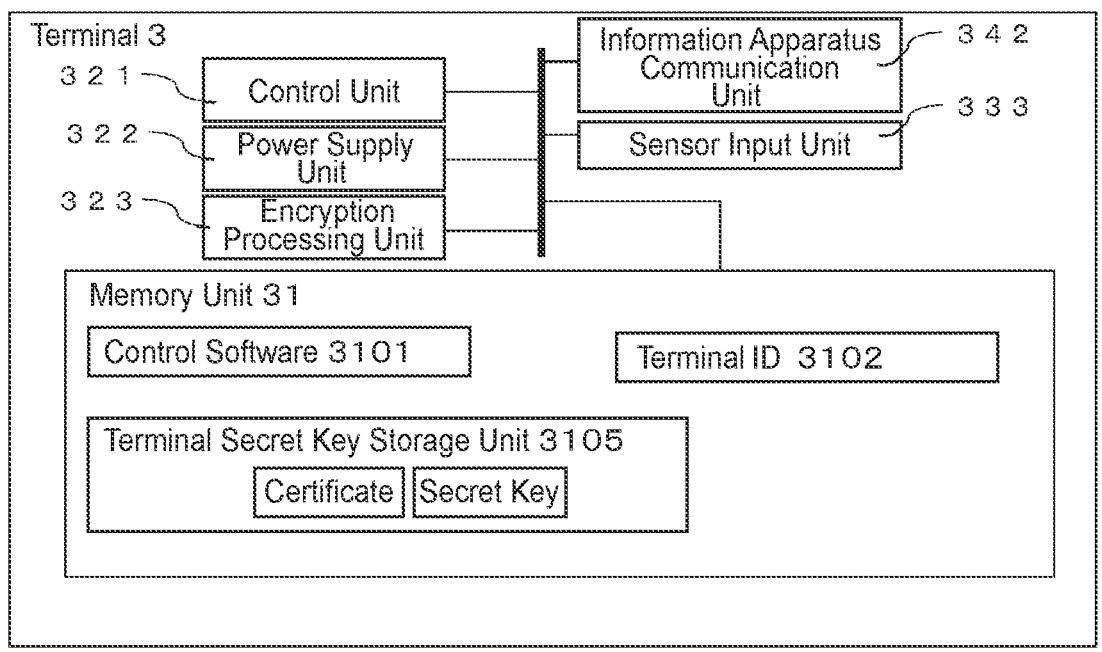
FIG. 4 is a diagram illustrating an example of a functional configuration of a terminal.

FIG. 4 is a diagram illustrating an example of a functional configuration of the terminal 3.

The terminal 3 includes a memory unit 31, a control unit 321, a power supply unit 322, an encryption processing unit 323, a sensor input unit 333, and an information apparatus communication unit 342 and these units are connected with bus lines or the like. Incidentally, FIG. 4 shows as if each module were physically connected to other modules inside the terminal 3; however, the modules do not necessarily have to be connected with bus lines, but may be electrically connected by other means or the terminal 3 may be configured so that only necessary modules may be connected to each other.

The memory unit 31 is composed of, for example, an EEPROM, flash memory, and so on or is partly composed of a ROM and so on and stores various kinds of information. Alternatively, the memory unit 31 may be composed of, for example, a magnetic disk or SSD. The content stored in the memory unit 31 is retained even in a state of no power supply from the power supply unit 322. The memory unit 31 stores, for example, operation control programs to be executed by the control unit 321 and necessary data for processing. Constituent elements included by the memory unit 31 will be explained later.

The control unit 321 is composed of a CPU, an MPU, a DSP, and so on and controls the operation of the entire terminal 3 by, for example, executing specified operation control programs.

The power supply unit 322 is composed of a battery, an AC adapter, a charging circuit, and so on, supplies power to each unit of the terminal 3, and charges batteries.

The encryption processing unit 323 is composed of a modular multiplication coprocessor, an encryption accelerator, and so on and is an apparatus to execute public key encryption processing such as RSA encryption or elliptic curve cryptography and common key encryption processing such as AES or DES at high speeds. A plurality of encryption processing units 323 may exist in the terminal 3 according to, for example, the encryption to be processed. Furthermore, it will be no problem if the encryption processing unit 323 is omitted as a constituent element and the control unit 321 executes the encryption processing.

The sensor input unit 333 is a module or an interface for the terminal 3 to collect necessary information in order to implement specified services which are the purposes of the M2M system or the IoT system. The sensor input unit 333 acquires specified information from outside or inside the terminal 3 and inputs it as an electric signal to the control unit 321. The sensor input unit 333 is a device such as a GPS, wireless LAN, or Bluetooth (registered trademark) for acquiring positional information, an image pickup device for capturing images, a microphone for acquiring voices, a device for managing time of the terminal 3 or acquiring time from outside, various sensors such as a temperature sensor, a strain sensor, an acceleration sensor, and a fine particle sensor, an input device such as a keypad or a touchpad, and a device for acquiring biological information, or a combination of the above-listed devices. The sensor input unit 333 may be a common device shared with the information apparatus communication unit 342 or other modules. A signature for confirming validity of information may be assigned to the information acquired from the sensor input unit 333. The information acquired by the sensor input unit 333 may be transmitted to the information apparatus 1 so that reference will be made to such information as the condition information when setting the terminal secret key to the terminal 3.

The terminal communication unit 342 is a function that makes the terminal 3 communicate with, for example, the information apparatus 1, and is a module for performing communication such as Bluetooth (registered trademark), NFC, Zigbee (registered trademark), USB, RS-232C, wired LAN, and wireless LAN. As for other communication modes, the modes are not limited to those listed above as long as the communication is performed to connect devices. Although it is not illustrated in the drawing, a module which communicates with the server 4 or other servers may exist in the configuration. In that case, such module may be the same module as the information apparatus communication unit 342. A plurality of terminal communication units 142 may exist in the terminal 3 according to, for example, the communication modes.

Incidentally, when the communication functions of the information apparatus communication unit 342 and so on are wireless communication, they may include an antenna(s), a modulator-demodulator circuit(s), and so on. When they are wired communication, they may include a connector(s), a modulator-demodulator circuit(s), and so on. Each information apparatus communication unit 342 may be configured so that it may adapt itself to a plurality of communication modes.

The memory unit 31 includes control software 3101, a terminal ID 3102, and a terminal secret key storage unit 3105. The memory unit 31 may include other constituent elements than those listed above.

The control software 3101 has software described therein for controlling the terminal 3 and is software for executing a sequence of processing flows by means of input from the sensor input unit 333, communication from the information apparatus communication unit 342, or a specified timer or other interruption processing. The control software 3101 may be of a composite type which is a plurality of pieces of software in collaboration. Incidentally, if it is described without any particular explanation as if the terminal 3 or the control software 3101 executes the processing, it means that physically the control unit 321 executes the processing in accordance with the description of the relevant program of the control software 3101.

The terminal ID 3102 is ID information of the terminal 3. The terminal ID 3102 is adequate numbers and character strings. The terminal ID 3102 may be MAC addresses of the terminal 3 and the information apparatus 1 or numbers which are input to the information apparatus 1 by the user watching the terminal 3. The terminal ID is transmitted via the information apparatus communication unit 342 to the information apparatus 1.

The terminal secret key storage unit 3105 is a constituent element for storing a terminal secret key used for, for example, authentication and encryption to communicate with terminals, servers, etc. in order for the terminal 3 to implement specified M2M services or IoT services. In a later explanation of a processing flow, the terminal secret key is set to the terminal 3 by means of communication via the information apparatus communication unit 342. Examples of the terminal secret key stored in the terminal secret key storage unit 3105 include a secret key and a public key certificate for implementing client authentication of PKI based on the public key encryption or an encryption key of the common key encryption. Examples of the terminal secret key may include other public key certificates of the authentication authority, servers, or other terminals. It may be fine to use composite information including necessary information for another authentication.

Figure 5:
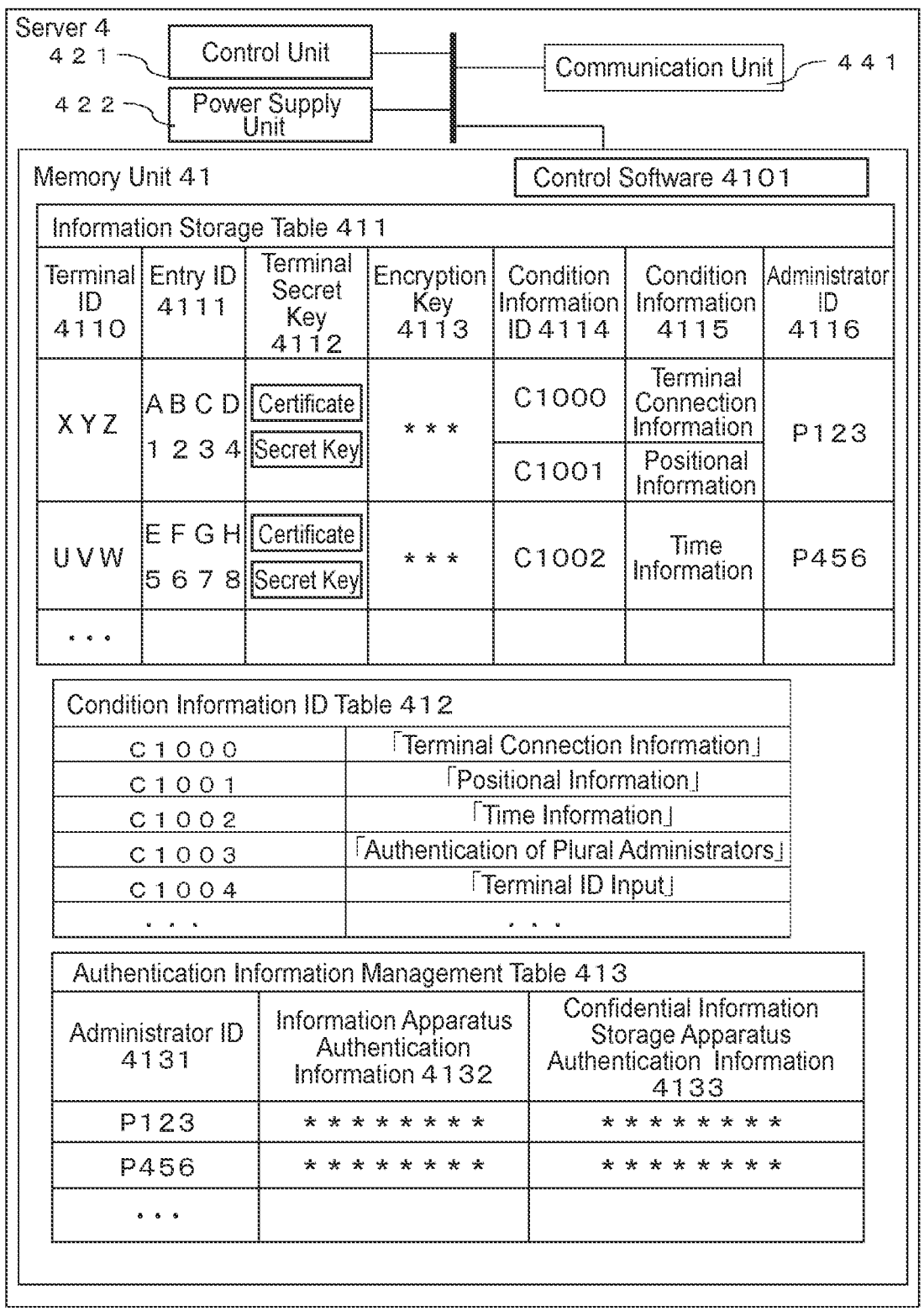
FIG. 5 is a diagram illustrating an example of a functional configuration of a server.

FIG. 5 is a diagram illustrating an example of a functional configuration of the server 4.

The server 4 includes a memory unit 41, a control unit 421, a power supply unit 422, and a communication unit 441 and these units are connected with bus lines or the like. Although it is not shown in the drawing, the server 4 may be equipped with other functions than those listed above. For example, the server 4 may include a volatile memory unit and an encryption processing unit. Incidentally, FIG. 5 shows as if each module were physically connected to other modules inside the server 4; however, the modules do not necessarily have to be connected with bus lines, but may be electrically connected by other means or the server 4 may be configured so that only necessary modules may be connected to each other. Furthermore, modules in separate housings may be combined, for example, electrically or via optical wiring.

The memory unit 41 is composed of, for example, a memory built in the server 4 such as a magnetic disk, SSD, EEPROM, or flash memory, or an external memory which is removable, and stores various kinds of information. For example, the memory unit 41 stores operation control programs to be executed by the control unit 421 and necessary data for processing. Constituent elements included by the memory unit 41 will be explained later.

The control unit 421 is composed of a CPU, an MPU, a DSP, and so on and controls the operation of the entire server 4 by, for example, executing specified operation control programs stored in the memory unit 41 or the like.

The communication unit 441: is a function that makes the server 4 communicate with, for example, the information apparatus 1; and is a module for performing wireless communication such as LTE, 3G, WiMAX, wireless LAN, and WAN or communication using a wired LAN, the Internet, and dedicated lines. A plurality of communication units 441 may exist in the server 4 according to, for example, the communication modes. The communication unit 441 may be shared with other modules for performing communication.

Incidentally, in case of wireless communication, the communication unit such as the communication unit 441 may include an antenna, a modulator-demodulator circuit, and so on. In a case of wired communication, the communication unit may include a connector, a modulator-demodulator circuit, and so on. Each communication unit such as the communication unit 441 may be configured so that it may adapt itself to a plurality of communication modes.

The memory unit 41 includes control software 4101, an information storage table 411, a condition information ID table 412, and an authentication information management table 413. The memory unit 41 may include other constituent elements than those listed above.

The control software 4101 has software described therein for controlling the server 4. The control software 4101 is software for executing a sequence of processing flows by means of communication from the communication unit 441 or a specified timer or other interruption processing. The control software 4101 may be of a composite type which is a plurality of pieces of software in collaboration. Incidentally, if it is described without any particular explanation as if the server 4 or the control software 4101 executes the processing, it means that physically the control unit 421 executes the processing in accordance with the description of the relevant program of the control software 4101.

The information storage table 411 is a constituent element for retaining specified information required to set the terminal secret key to the terminal 3. The information to be stored in the information storage table 411 is registered with the server 4 as necessary information for setting to the terminal 3 in advance by a management business operator of the M2M services or the IoT services. The information of the information storage table 411 is transmitted to the information apparatus 1 and the confidential information storage apparatus 2 by a specified method and is stored in the encrypted secret key storage table 111 and the information storage table 211. The information storage table 411 is composed of, for example, a database, a hash table, and so on.

The information storage table 411 includes a terminal ID 4110, an entry ID 4111, a terminal secret key 4112, an encryption key 4113, a condition information ID 4114, condition information 4115, and an administrator ID 4116 as elements of the table. Of these elements, the terminal ID 4110 is a constituent element which shares the same purpose with the terminal ID 2110, the entry ID 4111 is a constituent element which shares the same purpose with the entry ID 2111 and the entry ID 1111, the encryption key 4113 is a constituent element which shares the same purpose with the encryption key 2113, the condition information ID 4114 is a constituent element which shares the same purpose with the condition information ID 2114, and the condition information 4115 shares the same purpose with the condition information 2115, so that an explanation about them has been omitted.

The terminal secret key 4112 is a constituent element which shares the same purpose with the terminal secret key 1112; however, as explained later with respect to the processing flow later, it is only necessary for the terminal secret key 4112 to have been encrypted when it is transmitted from the server 4. Specifically speaking, the terminal secret key 4112 does not necessarily have to be kept in an encrypted state by the encryption key 4113. The terminal secret key 4112 may be kept in the encrypted state by the encryption key 4113. In this case, the encryption processing can be omitted in the later processing flow.

The administrator ID 4116 is a constituent element which shares the same purpose with the administrator ID 2103 and is associated with the entry ID 4111. The administrator ID 4116 indicates a user who is authorized to acquire data associated with the entry ID 4111. The drawing illustrates an example where one administrator ID is associated with one entry ID; however, it will be no problem if a plurality of administrator IDs are associated with one entry ID; and it will be no program if a plurality of entry IDs are associated with one administrator ID.

The condition information ID table 412 is a constituent element for storing the condition information IDs indicative of the types of conditions acquired by, for example, the sensor input unit 133 of the information apparatus 1 and is composed of a database, a hash table, and so on. Since specific examples illustrated in FIG. 5 are the same as those explained with respect to the condition information ID table 112, an explanation about them has been omitted.

The authentication information management table 413 includes an administrator ID 4131, information apparatus authentication information 4132, and confidential information storage apparatus authentication information 4133 as elements of the table.

The administrator ID 4131 is associated with the administrator ID stored in the administrator ID 4116. The information apparatus authentication information 4132 and the confidential information storage apparatus authentication information 4133 are associated with each other in order to identify the user having the administrator ID 4131.

The information apparatus authentication information 4132 is authentication information associated with the administrator ID 4131; the information apparatus authentication information 4132 is used for mutual authentication when the administrator of the administrator ID 4131 connects to the server 4 by using the information apparatus 1; and the information apparatus authentication information 4132 is also used to establish the encrypted communication between the server 4 and the information apparatus 1. The information apparatus authentication information 4132 is necessary information for the server authentication or the client authentication, or for both of them, as an example, for the server 4, the information apparatus 1, and the server 4 to perform SSL or TLS communication.

The confidential information storage apparatus authentication information 4133 is authentication information associated with the administrator ID 4131; the confidential information storage apparatus authentication information 4133 is used for mutual authentication when the administrator of the administrator ID 4131 connects to the server 4 by using the confidential information storage apparatus 2 and the information apparatus 1; and the confidential information storage apparatus authentication information 4133 is also used to establish the encrypted communication between the server 4 and the confidential information storage apparatus 2. The confidential information storage apparatus authentication information 4133 is necessary information for the server authentication or the client authentication, or for both of them, for the server 4, the information apparatus 1, and the server 4 to perform SSL or TLS communication. Alternatively, the confidential information storage apparatus authentication information 4133 is, for example, an encryption key which is necessary for authentication by the common key encryption.

Figure 6:
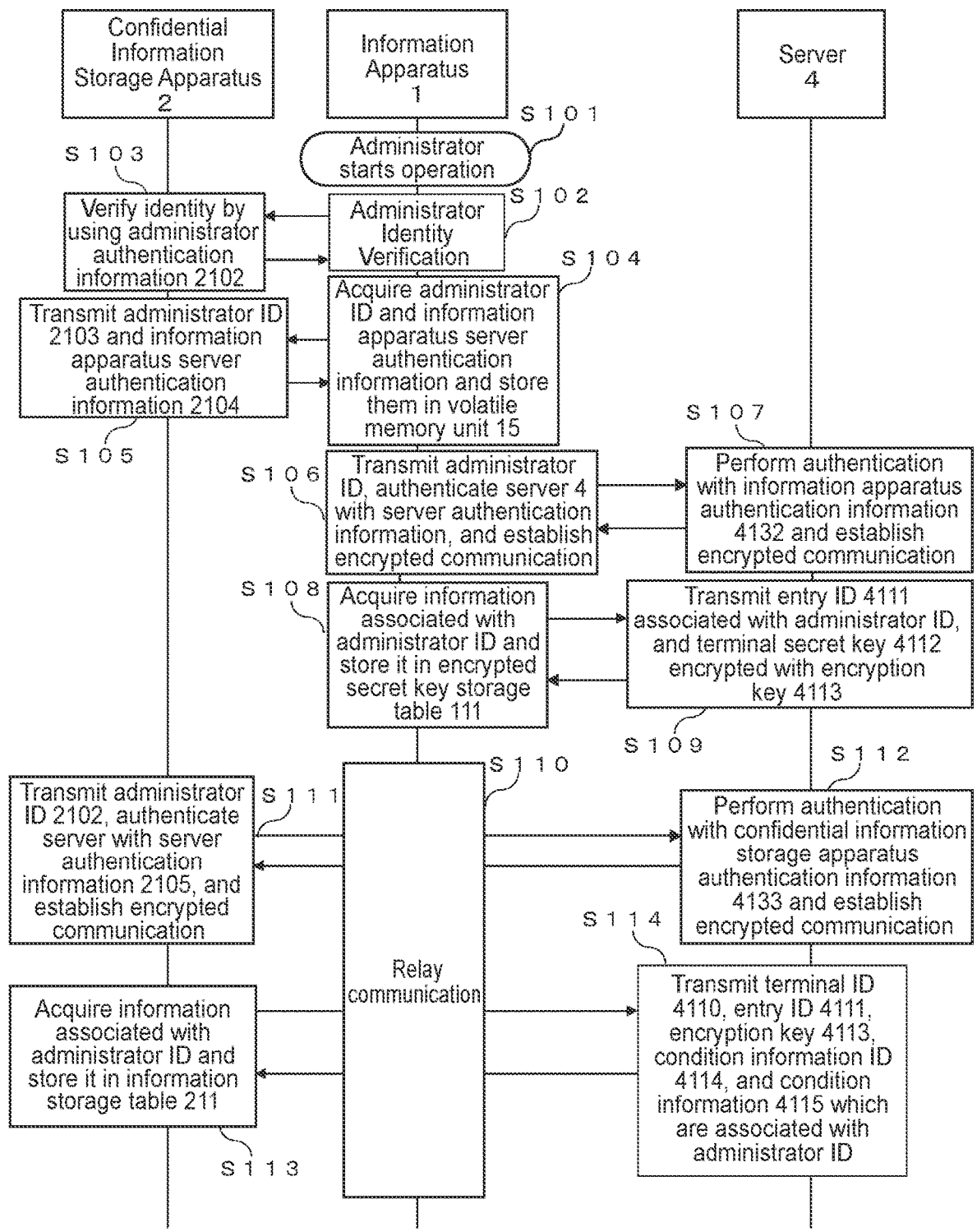
FIG. 6 is a diagram illustrating an example of processing of the information system.

FIG. 6 is a flow chart illustrating processing to be executed, prior to setting of the terminal secret key to the terminal 3, for the information apparatus 1 and the confidential information storage apparatus 2 to acquire necessary information from the server 4. Even without any particular explanation hereinafter given, exchanges of communication between the confidential information storage apparatus 2 and the server 4 may be relayed by the information apparatus 1 as necessary.

This processing flow is started as triggered by the administrator's input processing (S101). Subsequently, the identity verification of the administrator is performed (S102). The identity verification of the administrator is performed by, for example, acquiring a password, PIN, and biological information from the identity verification information input unit 132 and the password, PIN, biological information, and so on acquired to execute collation processing are transmitted to the confidential information storage apparatus 2. The confidential information storage apparatus 2 which has received them performs the identity verification by performing specified collation with the administrator authentication information 2102 and transmits the result to the information apparatus 1 (S103). Although it is not illustrated in the drawing, it is desirable under this circumstance that the confidential information storage apparatus 2 enters the state of "identity verified." When it is not in the state of "identity verified," processing for, for example, rejecting acceptance of processing explained in the subsequent flow is executed. When the identity verification succeeds, the information apparatus 1 sends a request to the confidential information storage apparatus 2 to acquire the administrator ID and the information apparatus server authentication information (S104); the confidential information storage apparatus 2 which has received this request transmits the administrator ID 2103 and the information apparatus server authentication information 2104 to the information apparatus 1 (S105); and the information apparatus 1 stores them in the administrator ID storage unit 1501 and the server authentication information storage unit 1502 of the volatile storage unit 15, respectively. When the information apparatus server authentication information 2104 is composed of composite information, only a part of it may be transmitted in S105. For example, when the information apparatus server authentication information 2104 is composed of the composite information and includes a secret key, the secret key does not have to be transmitted.

Subsequently, the information apparatus 1 transmits the administrator ID stored in the administrator ID storage unit 1501 to the server, performs the mutual authentication between the information apparatus 1 and the server 4 by using the server authentication information stored in the server authentication information storage unit 1502 and the information apparatus authentication information 4132 associated with the administrator ID, and establishes the encrypted communication (S106, S107). Although it is not illustrated in the drawing, plural sets of commands and responses may be performed to implement the mutual authentication and establish the encrypted communication. Furthermore, although it is not illustrated in the drawing, when it is necessary to refer to part of the information apparatus server authentication information 2104 of the confidential information storage apparatus 2 upon the mutual authentication and the encrypted communication, the information apparatus 1 may perform necessary communication with the confidential information storage apparatus 2 as the need arises. In the flow after S106 and S107, the communication between the information apparatus 1 and the server 4 is performed via the established encrypted communication unless otherwise particularly designated. Subsequently, the information apparatus 1 demands information associated with the administrator ID from the server 4 (S108); the server 4 transmits the entry ID 4111 associated with the administrator ID and the terminal secret key 4112 encrypted with the encryption key 4113 to the information apparatus 1 (S109); and the information apparatus 1 which has received them stores them in the entry ID 1111 and the terminal secret key 1112 of the encrypted secret key storage table 111, respectively. When there are a plurality of entries associated with the administrator ID, the server 4 may transmit all of them or only some of them. For example, the information apparatus 1 executes processing for acquiring the terminal ID 3102 from the terminal 3 in S204 and S205 of a flow explained later; however, an entry to be transmitted by the server 4 may be narrowed down based on the terminal ID by executing such processing before S108 and S109 and transmitting the terminal ID 3102 to the server 4.

Subsequently, the information apparatus 1 relays the communication between the confidential information storage apparatus 2 and the server 4 (S110). When the control software 2101 of the confidential information storage apparatus 2 is the subject of the processing, a command is fetched from the confidential information storage apparatus 2 and transmitted to the server 4 and its response is transmitted to the confidential information storage apparatus 2. Furthermore, when the control software 4101 of the server 4 is the subject of the processing, a command is fetched from the server 4 and transmitted to the confidential information storage apparatus 2 and its response is transmitted to the server 4. It may be sometimes hereinafter described that a request is issued from the confidential information storage apparatus 2, but the subject of the processing may be the server 4. In that case, the processing may be executed as the server 4 sends a request to the confidential information storage apparatus 2 and then the confidential information storage apparatus 2 returns necessary information in response to the request.

The confidential information storage apparatus 2 transmits the administrator ID stored in the administrator ID 2103 to the server, performs the mutual authentication between the confidential information storage apparatus 2 and the server 4 by using the server authentication information 2105 and the confidential information storage apparatus authentication information 4133 associated with the administrator ID, and establishes the encrypted communication (S111, S112). Although it is not illustrated in the drawing, plural sets of commands and responses may be performed to implement the mutual authentication and establish the encrypted communication. In the flow after S111 and S112, the communication between the confidential information storage apparatus 2 and the server 4 is performed via the established encrypted communication unless otherwise particularly designated. Subsequently, the confidential information storage apparatus 2 demands information associated with the administrator ID from the server 4 (S113); the server 4 transmits the terminal ID 4110, the entry ID 4111, the terminal secret key 4112, the encryption key 4113, the condition information ID 4114, and the condition information 4115, which are associated with the administrator ID, to the confidential information storage apparatus 2 (S114); and the confidential information storage apparatus 2 which has received them stores them in the terminal ID 2110, the entry ID 2111, the encryption key 2113, the condition information ID 2114, and the condition information 2115 of the information storage table 211, respectively. When there are a plurality of entries associated with the administrator ID, the server 4 may transmit all of them or only some of them. For example, when the information apparatus 1 transmits the terminal ID to the server 4 in the same manner as explained with respect to S108 and S109, an entry to be transmitted by the server 4 to the confidential information storage apparatus 2 may be narrowed down based on the terminal ID.

Figure 7:
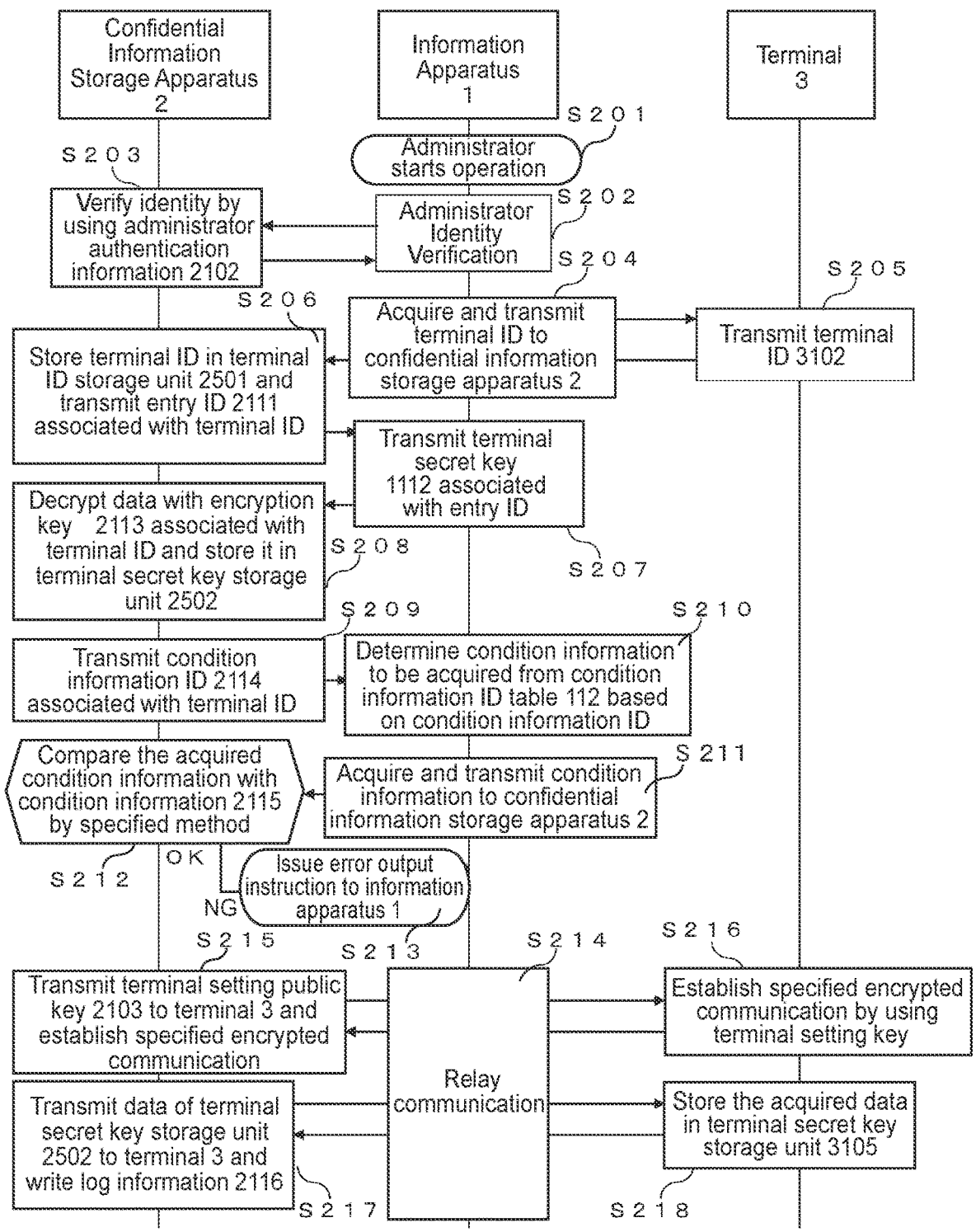
FIG. 7 is a diagram illustrating an example of processing of the information system.

FIG. 7 is a flow chart illustrating processing for setting the terminal secret key to the terminal 3. Even without any particular explanation hereinafter given, exchanges of communication between the confidential information storage apparatus 2 and the terminal 3 may be relayed by the information apparatus 1 as necessary.

The processing flow is started as triggered by the administrator's input processing (S201). Subsequently, the identity verification of the administrator is performed (S202). The identity verification of the administrator is performed by, for example, acquiring a password, PIN, and biological information from the identity verification information input unit 134 and the password, PIN, biological information, and so on acquired to execute collation processing are transmitted to the confidential information storage apparatus 2. The confidential information storage apparatus 2 which has received them performs the identity verification by performing specified collation with the administrator authentication information 2102 and transmits the result to the information apparatus 1 (S203). Although it is not illustrated in the drawing, it is desirable under this circumstance that the confidential information storage apparatus 2 enters the state of "identity verified." When it is not in the state of "identity verified," processing for, for example, rejecting acceptance of processing explained in the subsequent flow is executed. Furthermore, when the flow of FIG. 7 is executed subsequent to the flow of FIG. 6, the processing of S201 to S203 may be omitted.

When the identity verification succeeds, the information apparatus 1 sends a request to the terminal 3 to acquire the terminal ID (S204); the terminal 3 which has received this request transmits the terminal ID 3102 to the information apparatus 1 (S205); and the information apparatus 1 transmits it to the confidential information storage apparatus 2. Having received the terminal ID, the confidential information storage apparatus 2 stores the terminal ID in the terminal ID storage unit 2501 and transmits the entry ID 2111, which is associated with this terminal ID in the information storage table 211, to the information apparatus 1 (S206). Having received the entry ID, the information apparatus 1 transmits the terminal secret key 1112, which is associated with this entry ID in the encrypted secret key storage table 111, to the confidential information storage apparatus 2 (S207). Having received this, the confidential information storage apparatus 2 decrypts the acquired data with the encryption key 2113 associated with the terminal ID stored in the terminal ID storage unit 2501 in the information storage table 211, and stores the fetched terminal secret key in the terminal secret key storage unit 2502 (S208).

Subsequently, the confidential information storage apparatus 2 transmits the condition information ID 2114, which is associated, in the information storage table 211, with the terminal ID stored in the terminal ID storage unit 2501, to the information apparatus 1 (S209). Having received this, the information apparatus 1 judges the condition information to be acquired from the condition information ID table 112 on the basis of the acquired condition information ID (S210), acquires the condition information from the sensor input unit 133 and so on, and transmits it to the confidential information storage apparatus 2 (S211). Incidentally, examples of the condition information to be acquired and the acquisition method may be those mentioned in the explanation about the condition information ID table 112. When the information apparatus 1 receives a plurality of condition information IDs, it acquires the condition information for each condition information ID.

Next, the confidential information storage apparatus 2 which has received the condition information compares the acquired condition information with the condition information 2115 by a specified method and judges the result (S212). The details of the processing will be explained later with reference to FIG. 9 to FIG. 11. When it is determined as a result of the comparison that the given condition information is not appropriate (S212 NG), the confidential information storage apparatus 2 sends an error notice to the information apparatus 1 and the information apparatus 1 executes error processing by, for example, displaying the error on the display unit 131 and terminates the processing (S213). When the given condition information is appropriate as a result of the comparison (S212 OK), the confidential information storage apparatus 2 informs the information apparatus 1 to that effect.

Subsequently, the information apparatus 1 relays the communication between the confidential information storage apparatus 2 and the terminal 3 (S214). When the control software 2101 of the confidential information storage apparatus 2 is the subject of the processing, a command is fetched from the confidential information storage apparatus 2 and transmitted to the terminal 3 and its response is transmitted to the confidential information storage apparatus 2. Furthermore, when the control software 3101 of the terminal 3 is the subject of the processing, a command is fetched from the terminal 3 and transmitted to the confidential information storage apparatus 2 and its response is transmitted to the terminal 3. It may be sometimes hereinafter described that a request is issued from the confidential information storage apparatus 2, but the subject of the processing may be the terminal 3. In that case, the processing may be executed as the terminal 3 sends a request to the confidential information storage apparatus 2 and then the confidential information storage apparatus 2 returns necessary information in response to the request.

The confidential information storage apparatus 2 transmits the terminal setting public key 2103 to the terminal 3 and establishes specified encrypted communication with the terminal 3 which has received this terminal setting public key 2103 (S215, S216). Although it is not illustrated in the drawing, plural sets of commands and responses may be performed to establish the encrypted communication. In the flow after S215 and S216, the communication between the confidential information storage apparatus 2 and the terminal 3 is performed via the established encrypted communication unless otherwise particularly designated. Subsequently, the confidential information storage apparatus 2 transmits data of the terminal secret key storage unit 2502 to the terminal 3 and writes the written result as a log to the log information 2116 (S217). Although it is not illustrated in the drawing, the log information 2116 may be transmitted to the server 4 via the encrypted communication with the server 4.

Figure 8:
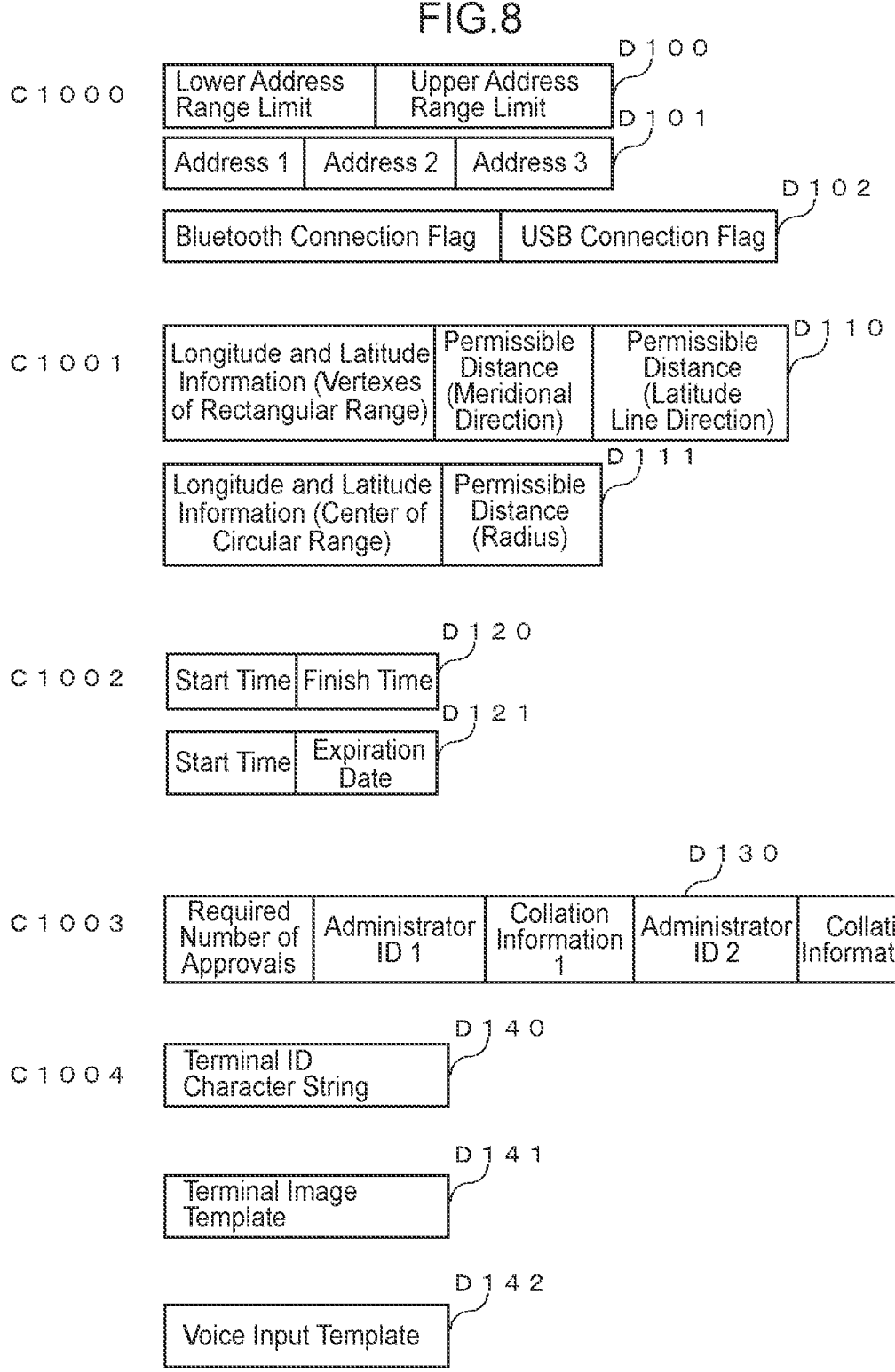
FIG. 8 is a diagram illustrating an example of condition information.

FIG. 8 illustrates a data structure of the condition information.

Examples of the condition information about the terminal connection information indicated with C1000 in FIG. 3 are illustrated in D100 to D102. D100 and D101 are cases where the address of the terminal 3 is the condition information when the terminal 3 and the information apparatus 1 communicate with each other. In this case, D100 retains an upper limit and a lower limit for a permitted address range as the condition information. D101 retains an address list as permitted addresses. D102 is a case where a communication method for communication between the terminal 3 and the information apparatus 1 is the condition information; and retains flags of permission or no permission according to connection modes. Connection modes which are not included in the list may be considered to be not permitted.

Examples of the condition information about the positional information indicated with C1001 in FIG. 3 are illustrated in D110 and D111. D110 and D111 are cases where the positional information of the information apparatus 1 or the terminal 3 is the condition information. D110 retains longitude and latitude information as vertexes of a rectangular range on a map. D110 also retains permitted distances in a meridional direction and in a latitude line direction together. Regarding the permitted distance, a reference numeral of the value may represent its direction and an absolute value of the value may represent the distance. D111 retains the longitude and latitude information as the center of a circular range. D111 also retains a radius from the center as a permitted distance. Each of D110 and D111 may be a combination of a plurality of pieces of information. Furthermore, D110 and D111 may individually have a flag for judging that a value within the range is permitted or a value outside the range is permitted.

Examples of the condition information about the time information indicated with C1002 in FIG. 3 are illustrated in D120 and D121. D120 and D121 are cases where the time information acquired from the information apparatus 1 or from the terminal 3 or the server 4 via the information terminal 1 is the condition information. D120 retains start time and finish time of permitted time. D121 retains the start time of the permitted time and an expiration date from the start time. Each of D120 and D121 may be a combination of a plurality of pieces of information. Furthermore, D120 and D121 may individually have a flag for judging that a value within the range is permitted or a value outside the range is permitted.

Examples of the condition information about the authentication of plural administrators as indicated with C1003 in FIG. 3 are illustrated in D130. D130 is a case where the administrator authentication information acquired from the information apparatus 1 is the condition information. The required number of approvals in D130 indicates the number of approvals required to obtain a permission for the processing. Furthermore, D130 retains one or more sets of administrator IDs and collation information; and when the administrator ID and the collation information which are acquired from the information apparatus 1 match the corresponding administrator ID and collation information or the conformity of the collation result by a specified collation method exceeds a specified threshold value, it is determined that the collation has succeeded. It is desirable that the administrator ID(s) for which the collation has succeeded is retained in, for example, the volatile memory unit 25; and a permission for the processing is obtained when the number of such administrator ID(s) is equal to or more than the required number of approvals.

Examples of the condition information about the terminal ID input indicated with C1004 in FIG. 3 are illustrated in D140 to D142. D140 is a case where input of a character string of the terminal ID acquired from the information apparatus 1 is the condition information. The terminal ID character string acquired from the information terminal 1 is input from the input unit 132 by the user or is acquired from the sensor input unit 133. The acquisition from the sensor input unit 133 includes, for example, reading of an RFID or bar code pasted or printed on a surface of the terminal 3. D140 retains the terminal ID character string and is collated with these pieces of information. D141 retains a terminal image template. The terminal image template is generated in advance in order to collate an image taken of the terminal 3. The terminal ID pasted or printed on the surface of the terminal 3 may be included in part of the image. D142 retains a voice input template. The voice input template is generated in advance to collate information of the terminal ID of the terminal 3 which is read out by the user.

Figure 11:
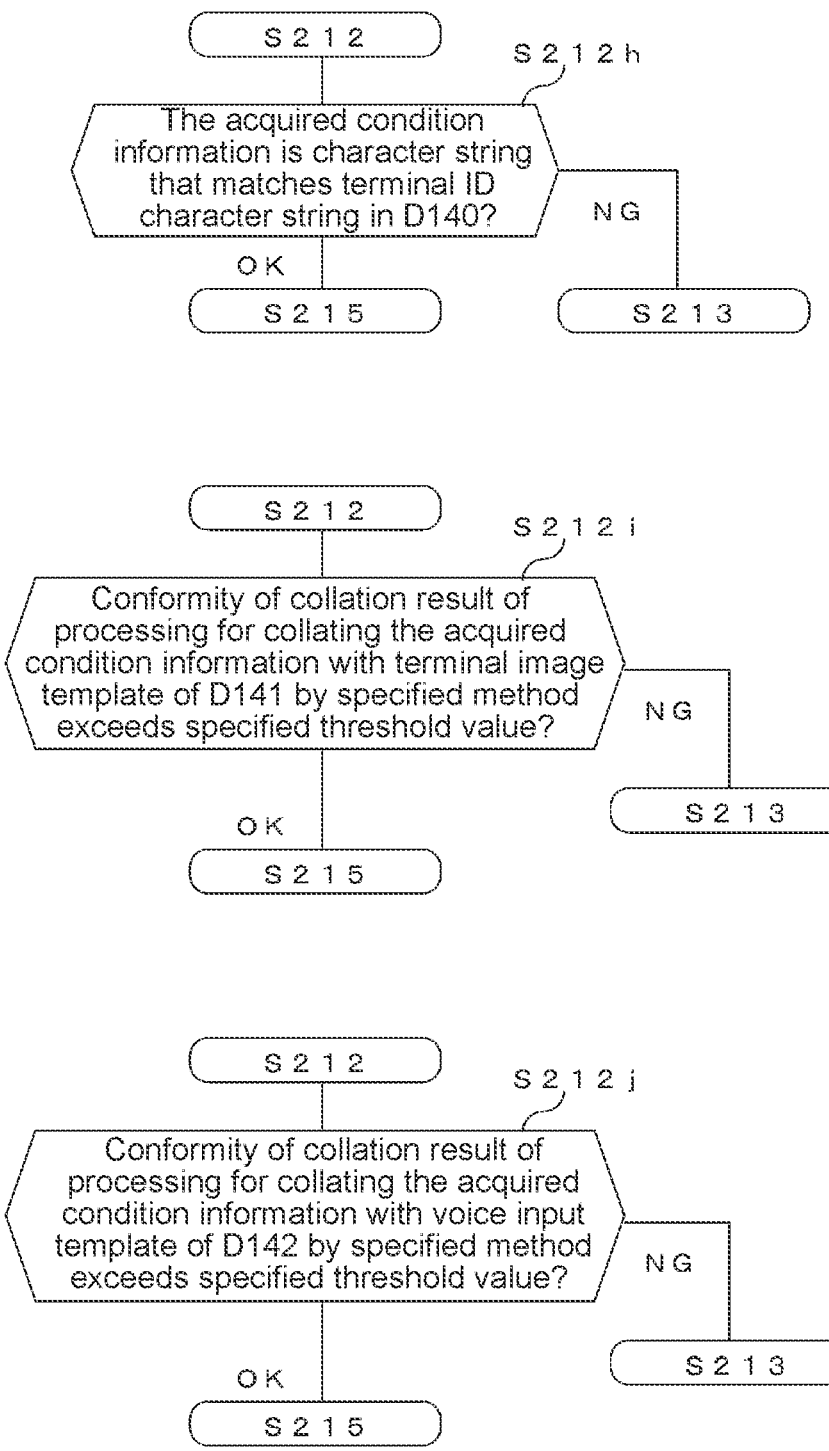
FIG. 11 is a diagram illustrating an example of processing of the information system.

FIG. 9 to FIG. 11 are diagrams illustrating detailed processing flows of S212. FIG. 9 to FIG. 11 describe the judgment processing inside S212. Although a description about S412 mentioned later is omitted, a comparison with the condition information is similar to examples indicated with respect to S212.

FIG. 9 illustrates the detailed processing in S212a to S212c with respect to each judgment using D100 to D102.

In S212a, whether or not the acquired condition information is address information between the lower address range limit and the upper address range limit in D100 is judged; and if the judgment result is OK, the processing makes a transition to S215; and otherwise, the processing makes a transition to S213. As a result of this processing, the terminal secret key can be set to the terminal 3 as long as the address range of the terminal 3 is within the specified appropriate range.

In S212b, whether or not the acquired condition information matches any one of the addresses described in D101 is judged; and if the judgment result is OK, the processing makes a transition to S215; and otherwise, the processing makes a transition to S213. As a result of this processing, the terminal secret key can be set to the terminal 3 only when the address of the terminal 3 is an appropriate address which is stored in advance. Furthermore, the judgment can be performed by combining the processing of S212a and S212b. In this case, for example, even if the address of the terminal 3 is an address outside the range of D100, it is exceptionally judged as being an "adequate address" and setting of the terminal secret key is permitted if it is the address described in D101.

In S212c, whether or not the acquired condition information matches the connection method permitted by the flag described in D102 is judged; and if the judgment result is OK, the processing makes a transition to S215; and otherwise, the processing makes a transition to S213. As a result of this processing, the terminal secret key can be set to the terminal 3 only when the terminal 3 and the information apparatus 1 are connected by the adequate connection method predicted in advance.

FIG. 10 illustrates the detailed processing in S212d to S212g with respect to each judgment using D110 to D111, D120 to D121, and D130.

In S212d, whether or not the acquired condition information is the positional information indicative of a position within the range designated in D110 is judged; and if the judgment result is OK, the processing makes a transition to S215; and otherwise, the processing makes a transition to S213. The method for designating the range of the positional information in D110 is as explained with reference to FIG. 8. Alternatively, in S212d, whether or not the acquired condition information is the positional information indicative of a position within the range designated in D111 is judged; and if the judgment result is OK, the processing makes a transition to S215; and otherwise, the processing makes a transition to S213. The method for designating the range of the positional information in D111 is as explained with reference to FIG. 8. As a result of this processing, the terminal secret key can be set to the terminal 3 only at the specified adequate position which is predicted in advance. Incidentally, in S212d as explained earlier, the judgment result may be set to be OK when the position is outside the range; and the judgment result may be set to be NG when the position is within the range. In this case, it is possible to prevent the secret key from being set at a specified false position which is predicted in advance. This example is effective when, for example, the storage capacity of the confidential information storage apparatus 2 needs to be saved.

In S212*e*, whether or not the acquired condition information is the time information indicative of time within the range designated in D120 is judged; and if the judgment result is OK, the processing makes a transition to S215; and otherwise, the processing makes a transition to S213. The method for designating the range of the time information in D120 is as explained with reference to FIG. 8. Alternatively, in S212*e*, whether or not the acquired condition information is the time information indicative of time within the range designated in D121 is judged; and if the judgment result is OK, the processing makes a transition to S215; and otherwise, the processing makes a transition to S213. The method for designating the range of the time information in D121 is as explained with reference to FIG. 8. As a result of this processing, the terminal secret key can be set to the terminal 3 only in a specified adequate time slot which is predicted in advance. Incidentally, in S212*e* as explained earlier, the judgment result may be set to be OK when the time is outside the range; and the judgment result may be set to be NG when the time is within the range. In this case, it is possible to prevent the secret key from being set in a specified false time slot which is predicted in advance. This example is effective when, for example, the storage capacity of the confidential information storage apparatus 2 needs to be saved.

In S212*f*, whether the collation between the acquired condition information with the administrator ID and the collation information which are designated in D130 succeeds or not is judged; and if the judgment result is OK, the processing makes a transition to S212*g*; and otherwise, the processing makes a transition to S213. The method for judgment on the success of the collation is as explained with reference to FIG. 8. In S212*g*, whether the number of collation successes satisfies the required number of approvals is judged; and if the judgment result is OK, the processing makes a transition to S215; and otherwise, additional condition information is acquired by making a transition to S209. As a result of this processing, the terminal secret key can be set to the terminal 3 only after the users as many as the number predicted in advance are authenticated. Incidentally, when performing the user authentication more than once, the order of authentication of each user may be stored in advance; and setting of the terminal secret key may be permitted only when the authentication is performed in that order. In this case, the terminal secret key can be set only when approvals are granted in an authorized order, for example, in the order of users of low-level positions first and then users of high-level positions.

FIG. 11 illustrates the detailed processing in S212*h* to S212*j* with respect to each judgment using D140 to D142.

In S212*h*, whether or not the acquired condition information is a character string that matches the terminal ID character string in D140 is judged; and if the judgment result is OK, the processing makes a transition to S215; and otherwise, the processing makes a transition to S213. As a result of this processing, the terminal secret key can be set to only the authorized terminal to which the ID is assigned in advance.

In S212*i*, whether the collation result of the collation processing on the acquired condition information and the terminal image template in D141 by the specified method exceeds a specified threshold value or not is judged; and if the judgment result is OK, the processing makes a transition to S215; and otherwise, the processing makes a transition to S213. As a result of this processing, it is possible to implement strict ID management and for the user to save the effort of manually inputting the ID. This example is effective, for example, when there are many terminals and it is desirable to move the terminals on a conveyer or the like in front of an imaging device and automatically execute the judgment processing in S212.

In S212*j*, whether the collation result of the collation processing on the acquired condition information and the voice input template in D142 by the specified method exceeds a specified threshold value or not is judged; and if the judgment result is OK, the processing makes a transition to S215; and otherwise, the processing makes a transition to S213. As a result of this processing, it is possible for the user to save the effort of manually inputting the ID.

Incidentally, each of the judgment flows from FIG. 9 to FIG. 11 is described independently; however, a judgment may be performed by combining these judgments. Specifically speaking, since the plurality of pieces of condition information (C1000, C1001) are described in the row "XYZ" of the terminal ID 2110 as explained with reference to FIG. 3, the judgment processing of S212*c* and S212*d* will be executed in series in such a case.

Figure 12:
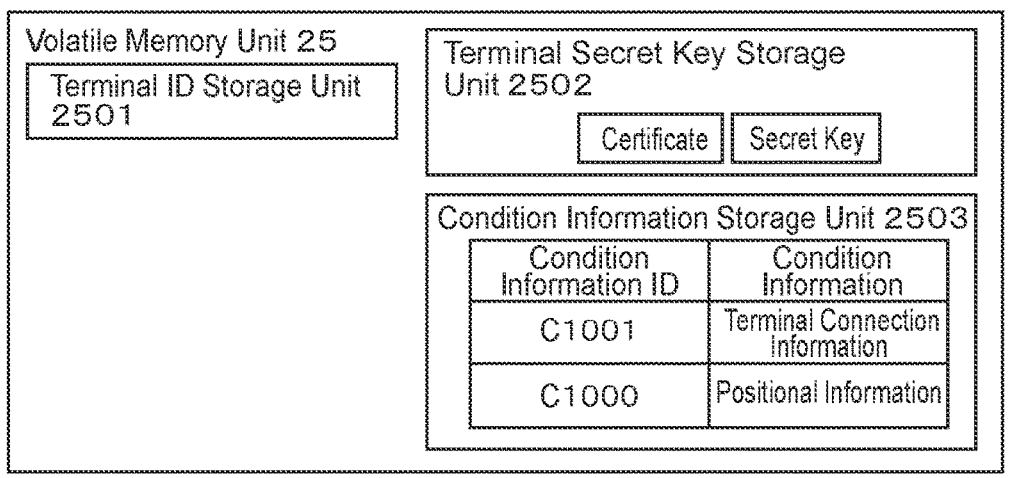
FIG. 12 is a diagram illustrating an example of a functional configuration of the information system.
Figure 13:
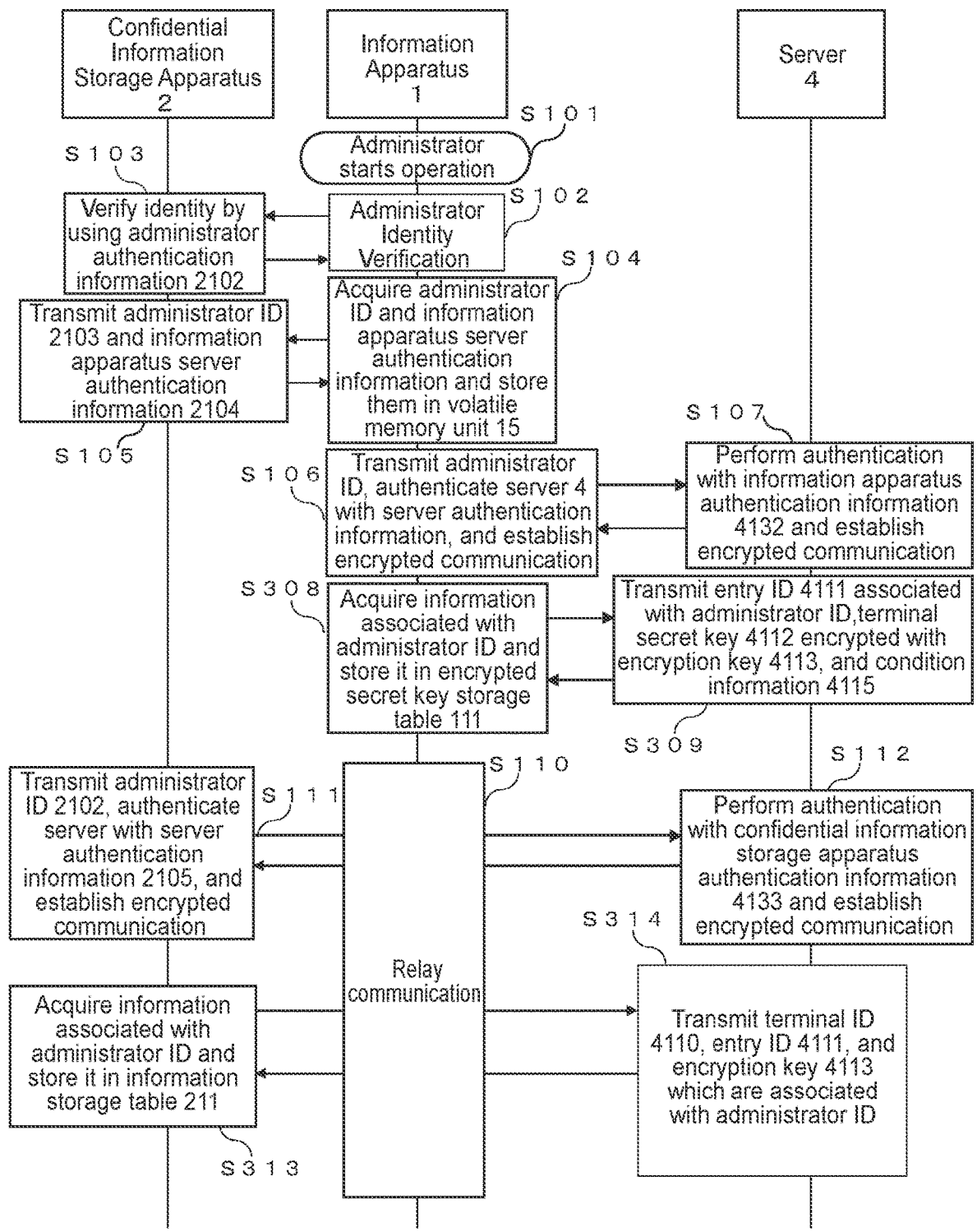
FIG. 13 is a diagram illustrating an example of processing of the information system.
Figure 14:
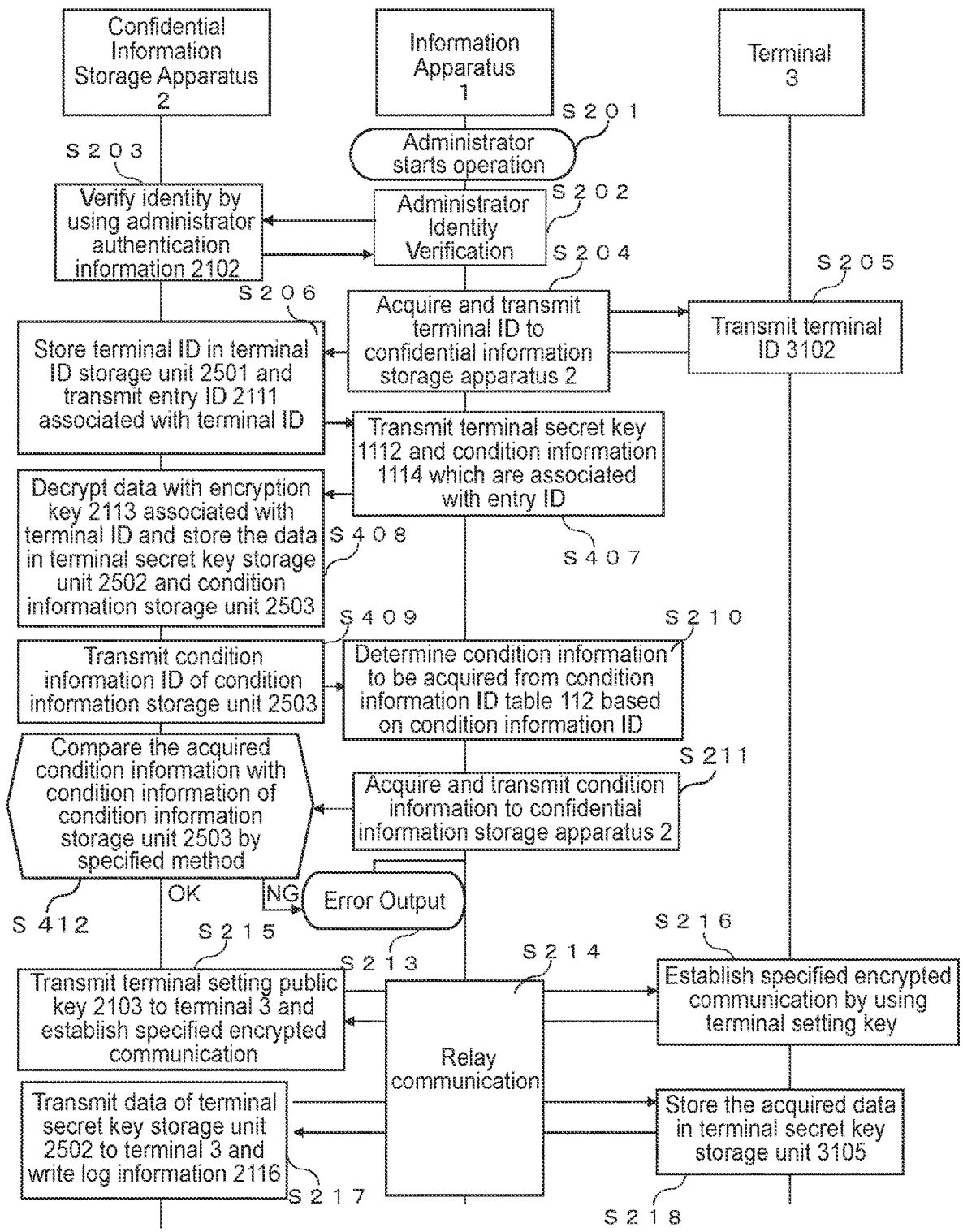
FIG. 14 is a diagram illustrating an example of processing of the information system.

FIG. 12 to FIG. 14 illustrate an example of the configuration and processing for indicating another method for setting the terminal secret key to the terminal 3. In this example, information corresponding to the condition information 2114 is encrypted and stored in the information apparatus 1. As a result, the capacity of the memory unit 21 for the confidential information storage apparatus 2 can be saved more.

FIG. 12 illustrates another configuration example of the encrypted secret key storage table 111 of the information apparatus 1 and the information storage table 211 and the volatile memory unit 25 of the confidential information storage apparatus 2.

The encrypted secret key storage table 111 stores data which is obtained by encrypting the condition information ID 2114 and the condition information 2115 illustrated in FIG. 3, as condition information 1114 in addition to the constituent elements illustrated in FIG. 2. The encryption is performed by the server 4 by using the encryption key 4113.

The information storage table 211 is formed by omitting the condition information ID 2114 and the condition information 2115, which are no longer necessary constituent elements as they are encrypted and stored in the encrypted secret key storage table 111, from the information storage table 211 illustrated in FIG. 3.

The volatile memory unit 25 includes a condition information storage unit 2503 for storing the condition information ID and the condition information which are decrypted, in addition to the constituent elements illustrated in FIG. 3.

FIG. 13 illustrates an example of processing for the information apparatus 1 and the confidential information storage apparatus 2 to acquire necessary information from the server 4 beforehand in order to set the terminal secret key to the terminal 3 by using the configuration example in FIG. 12. Incidentally, regarding the same processing as the flow illustrated in FIG. 6, the same numbers as those assigned in FIG. 6 are assigned and an explanation about them has been omitted.

Following the processing of S106 and S107, the information apparatus 1 demands information associated with the administrator ID from the server 4 (S308) and the server 4 transmits the entry ID 4111 associated with the administrator ID, the terminal secret key 4112 encrypted with the encryption key 4113, and the condition information ID 4114 and the condition information 4115 which are encrypted with the encryption key 4113, to the information apparatus 1 (S309). Having received these pieces of information, the information apparatus 1 stores them in the entry ID 1111, the terminal secret key 1112, and the condition information 1114 of the encrypted secret key storage table 111, respectively.

FIG. 14 illustrates an example of processing for setting the terminal secret key to the terminal 3 by using the configuration example of FIG. 12. Incidentally, regarding the same processing as the flow illustrated in FIG. 7, the same numbers as those assigned in FIG. 7 are assigned and an explanation about them has been omitted.

Following S206, the information apparatus 1 which has acquired the entry ID transmits the terminal secret key 1112 and the condition information 1114, which are associated with this entry ID in the encrypted secret key storage table 111, to the confidential information storage apparatus 2 (S407). The confidential information storage apparatus 2 which has received them: decrypts the acquired data with the encryption key 2113, which can be acquired by referring to the information storage table 211 with respect to the terminal ID stored in the terminal ID storage unit 2501; and stores the terminal secret key and the condition information, which have been taken out, in the terminal secret key storage unit 2502 and the condition information storage unit 2503, respectively (S408). Subsequently, the condition information ID stored in the condition information storage unit 2503 is transmitted to the information apparatus 1 (S409).

Figure 17:
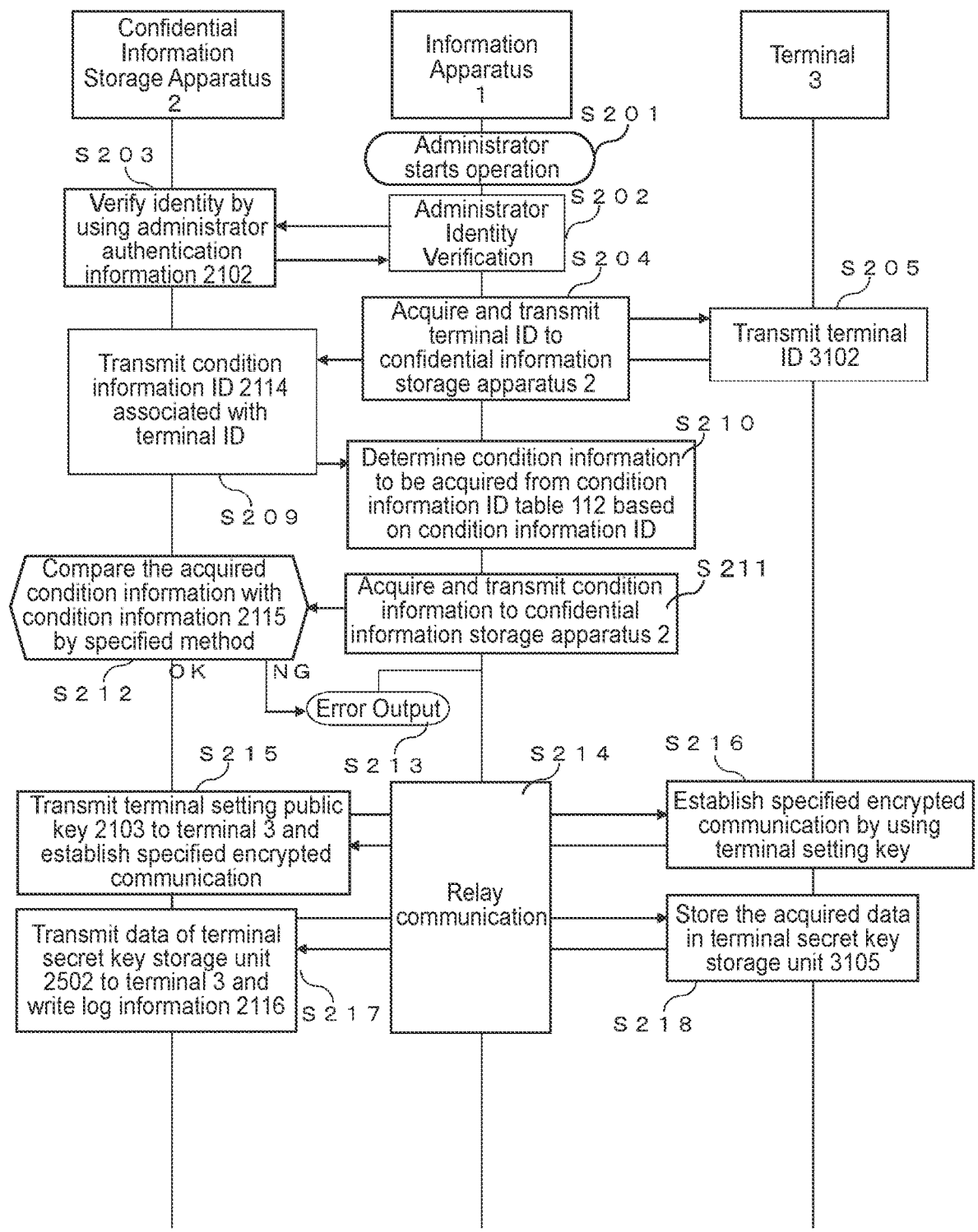
FIG. 17 is a diagram illustrating an example of processing of the information system.

FIG. 15 to FIG. 17 illustrate an example of the configuration and processing for indicating another method for setting the terminal secret key to the terminal 3. In this example, information corresponding to the terminal secret key 1112 of the information apparatus 1 is stored in the confidential information storage apparatus 2. As a result, processing time required for the decryption processing and processing time caused by communication between the information apparatus 1a and the confidential information storage apparatus 2 can be reduced and the speed of the entire processing can be increased.

FIG. 15 illustrates another configuration example of the memory unit 11 of the information apparatus 1, the information storage table 211 and the volatile memory unit 25 of the confidential information storage apparatus 2, and the information storage table 411 of the server 4.

The memory unit 11 is obtained by omitting the encrypted secret key storage table 111, which is a constituent element that has become no longer necessary as the information corresponding to the terminal secret key 1112 is stored in the confidential information storage apparatus 2, from the memory unit 11 illustrated in FIG. 2.

The information storage table 211 stores the terminal secret key 4112 illustrated in FIG. 4 as the terminal secret key 2117 in addition to the constituent elements illustrated in FIG. 3. Data stored in the terminal secret key 2117 is information equivalent to the terminal secret key 1112 illustrated in FIG. 2, but does not have to be encrypted.

The encrypted secret key storage table 111 stores data, which is obtained by encrypting the condition information ID 2114 and the condition information 2115 illustrated in FIG. 3, as the condition information 1114 in addition to the constituent elements illustrated in FIG. 2. Similarly, the encryption key 2113 which is a constituent element that has become no longer necessary has been omitted.

The volatile memory unit 25 is obtained by omitting the terminal secret key storage unit 2502, which is a constituent element that has similarly become no longer necessary, from the volatile memory unit 25 illustrated in FIG. 3.

The information storage table 411 is obtained by omitting the encryption key 4113, which is a constituent element that has similarly become no longer necessary, from the information storage table 411 illustrated in FIG. 5.

FIG. 16 illustrates an example of processing for the information apparatus 1 and the confidential information storage apparatus 2 to acquire necessary information from the server 4 beforehand in order to set the terminal secret key to the terminal 3 by using the configuration example of FIG. 15. Incidentally, regarding the same processing as the flow illustrated in FIG. 6, the same numbers as those assigned in FIG. 6 are assigned and an explanation about them has been omitted.

Referring to FIGS. 16, S108 and S109 which are the processing that has become similarly no longer necessary are omitted. Following S111 and S112, the confidential information storage apparatus 2 demands information associated with the administrator ID from the server 4 (S613). The server 4 transmits the terminal ID 4110, the entry ID 4111, the terminal secret key 4112, the condition information ID 4114, and the condition information 4115, which are associated with the administrator ID, to the confidential information storage apparatus 2 (S614). Having received them, the confidential information storage apparatus 2 stores these pieces of information in the terminal ID 2110, the entry ID 2111, the terminal secret key 2117, the condition information ID 2114, and the condition information 2115 of the information storage table 211, respectively. When there are a plurality of entries associated with the administrator ID, the example explained in S114 may be performed.

FIG. 17 illustrates an example of processing for setting the terminal secret key to the terminal 3 by using the configuration example of FIG. 15. Incidentally, regarding the same processing as the flow illustrated in FIG. 7, the same numbers as those assigned in FIG. 7 are assigned and an explanation about them has been omitted.

Referring to FIGS. 17, S206 and S208 which are the processing that has become similarly no longer necessary are omitted and S209 is performed after S204.

Figure 18:
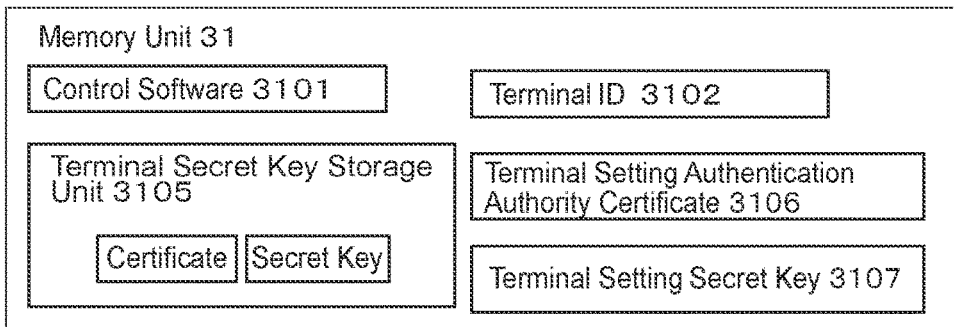
FIG. 18 is a diagram illustrating an example of a functional configuration of the information system.
Figure 19:
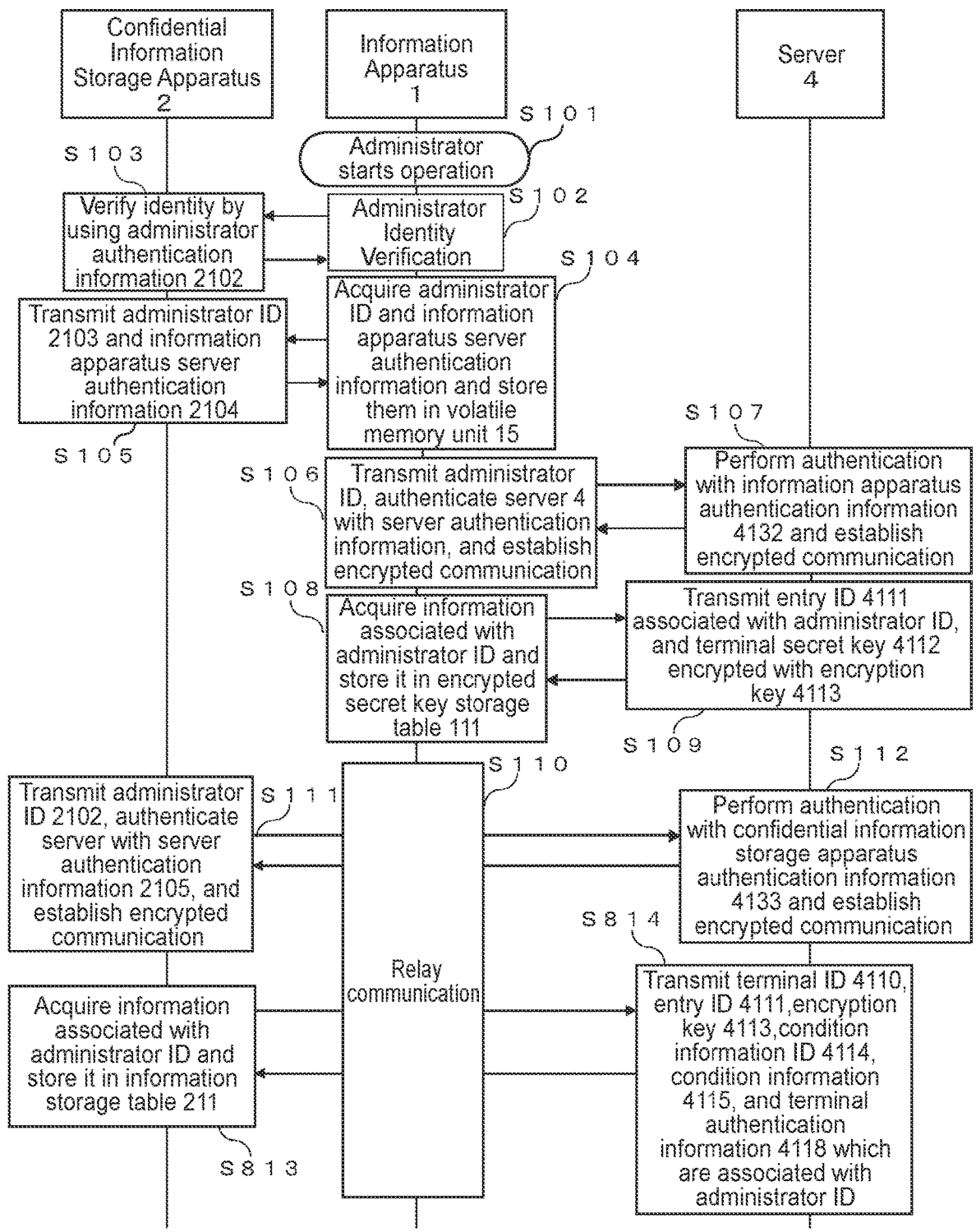
FIG. 19 is a diagram illustrating an example of processing of the information system.
Figure 20:
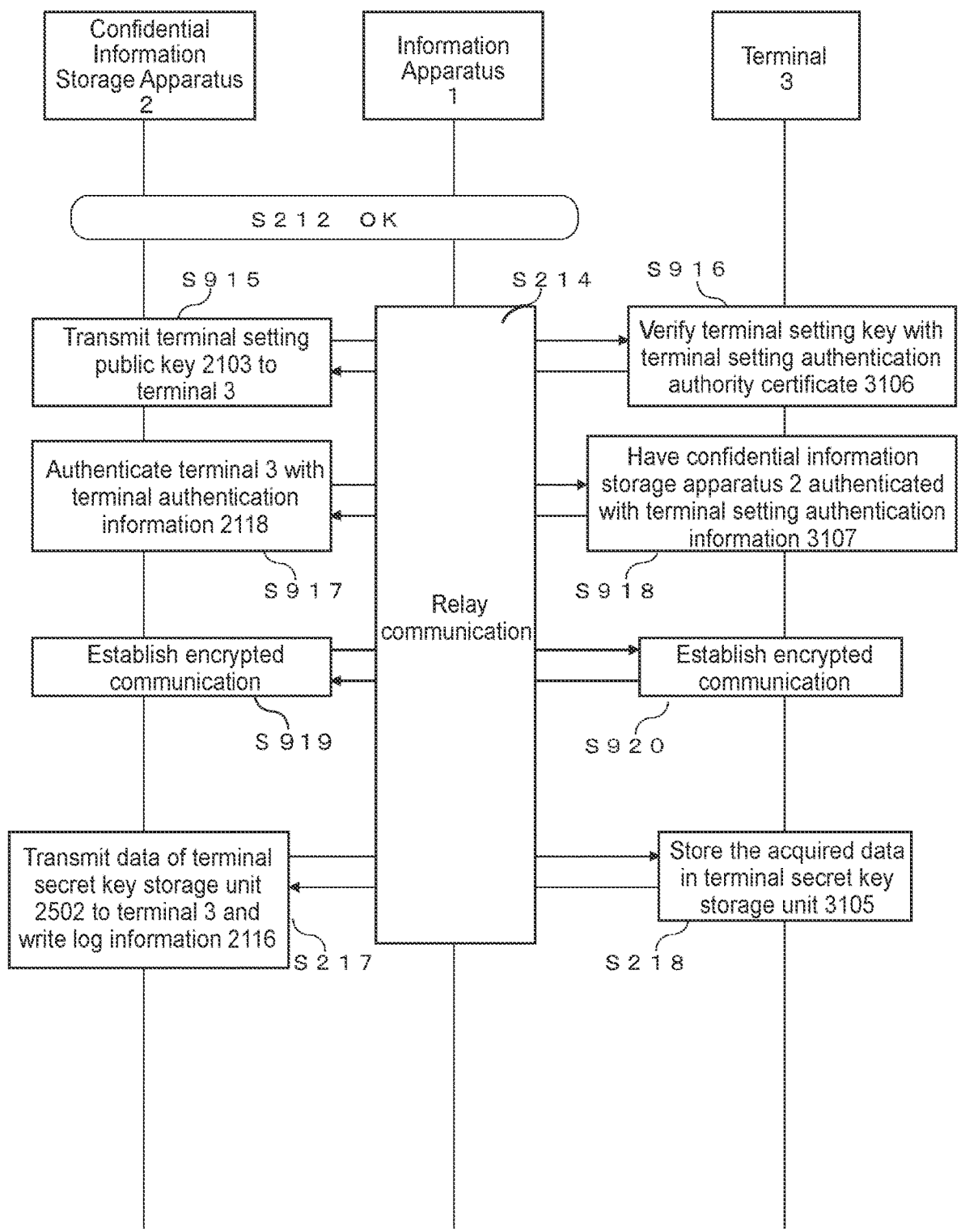
FIG. 20 is a diagram illustrating an example of processing of the information system.

FIG. 18 to FIG. 20 illustrate an example of the configuration and processing for indicating another method for setting the terminal secret key to the terminal 3. This example is an example where the terminal 3 retains, in advance, information for performing mutual authentication with the confidential information storage apparatus 2. When the terminal 3 has a satisfying security function, the terminal secret key can be set with the enhanced safety.

FIG. 18 illustrates another configuration example of the information storage table 211 of the confidential information storage apparatus 2, the memory unit 31 of the terminal 3, and the information storage table 411 of the server 4.

The information storage table 211 has a constituent element which retains terminal authentication information 2118 associated with the entry ID 2111, in addition to the configuration illustrated in FIG. 3. The terminal authentication information 2118 is information used for mutual authentication with the terminal 3 by the confidential information storage apparatus 2 and retains an encryption key for common key encryption and a public key certificate to authenticate the terminal 3 by means of PKI based on public key encryption.

The memory unit 31 retains a terminal setting authentication authority certificate 3106 and a terminal setting secret key 3107 in addition to the configuration illustrated in FIG. 4. The memory unit 31 may retain only either one of them.

The terminal setting authentication authority certificate 3106 is a public key certificate, etc. by an authentication authority which has signed a public key certificate of PKI when the terminal authentication information 2118 of the confidential information storage apparatus includes the public key certificate of PKI. The terminal setting secret key 3107 is information retained by the confidential information storage apparatus 2 to authenticate the terminal 3; and, as an example, the terminal setting secret key 3107 may possibly retain an encryption key for the common key encryption, a secret key which is necessary for authentication processing by means of PKI based on the public key encryption, and a public key certificate which constitutes a pair with the secret key.

The information storage table 411 includes a constituent element to store the terminal authentication information explained with respect to the terminal authentication information 2118 by associating it as terminal information 4118 with the entry ID 4111, in addition to the configuration illustrated in FIG. 5.

FIG. 19 illustrates an example of processing for making the information apparatus 1 and the confidential information storage apparatus 2 acquire necessary information from the server 4 beforehand to set the terminal secret key to the terminal 3 by using the configuration example in FIG. 18. Incidentally, regarding the same processing as that illustrated in FIG. 6, the same numbers as those assigned in FIG. 6 are assigned and an explanation about them has been omitted.

Following S111 and S112, the confidential information storage apparatus 2 demands information associated with the administrator ID from the server 4 (S813). The server 4 transmits the terminal ID 4110, the entry ID 4111, the terminal secret key 4112, the condition information ID 4114, the condition information 4115, and the terminal authentication information 4118, which are associated with the administrator ID, to the confidential information storage apparatus 2 (S814). The confidential information storage apparatus 2 which has received these pieces of information stores them in the terminal ID 2110, the entry ID 2111, the terminal secret key 2117, the condition information ID 2114, the condition information 2115, and the terminal authentication information 2118 of the information storage table 211, respectively. When there are a plurality of entries associated with the administrator ID, the example explained in S114 may be implemented.

FIG. 20 illustrates an example of processing for setting the terminal secret key to the terminal 3 by using the configuration example in FIG. 18. Incidentally, regarding the same processing as that illustrated in FIG. 7, the same numbers as those assigned in FIG. 7 are assigned and an explanation about them has been omitted.

Following the success of S212, the information apparatus 1 performs S214. The confidential information storage apparatus 2 transmits the terminal setting public key 2103 to the terminal 3 (S915). The terminal 3 verifies the acquired terminal setting public key with a public key taken out of the terminal setting authentication authority certificate 3106 (S916). Subsequently, the confidential information storage apparatus 2 authenticates the terminal 3 with the terminal authentication information 2118 and the terminal setting authentication information 3107 (S917, S918). For example, the public key certificate of the terminal 3 is verified by the confidential information storage apparatus 2 and it is checked by means of communication that the terminal 3 retains a secret key which constitutes a pair with the public key certificate. The encrypted communication is established from S915 to S918 (S919, S920). Unless otherwise stated, communication between the confidential information storage apparatus 2 and the terminal 3 is performed by way of the established encrypted communication in the flow after S919 and S920.

Even when the details are not indicated in the relevant flow through the entire description of the present invention and if whatever error occurs when the flow sequence is performed, the occurrence of the error may be reported to a control unit of each constituent element.

Furthermore, although it is not described in detail in the flow, the control software 121 may notify the user of processing which is then being executed, by using the display unit 131 or the like as the need arises. Particularly, when the sequence of processing is completed or branches, it is desirable that the user should be notified to that effect by using each display unit. Furthermore, an inquiry may be made to the user by combining the display unit 131 and the input unit 132 and presenting a judgment on the branching.

Furthermore, exchanges of information between steps may be sometimes omitted from the relevant flow; however, practically, such exchanges of information may sometimes constitute a pair of a command and a response to the command. Furthermore, even when exchanges of information between the respective steps are indicated with a set of bidirectional arrows, it will be no problem if a plurality of commands and responses are included there. Moreover, even when it is stated that data are transmitted and received between entities, actual communications may be performed via commands and responses between one entity serving as a client and the other entity serving as a server to achieve the above-mentioned data transmission as a result.

Incidentally, the present invention is not limited to each of the aforementioned embodiments, and includes various variations. For example, each of the aforementioned embodiments has been described in detail in order to explain the invention in an easily comprehensible manner and is not necessarily limited to those having all the configurations explained above. Furthermore, part of the configuration of an embodiment can be replaced with the configuration of another embodiment and the configuration of another embodiment can be added to the configuration of a certain embodiment. Also, the configuration of another configuration can be added to, or deleted from, or replaced with, part of the configuration of each embodiment.

Figure 21:
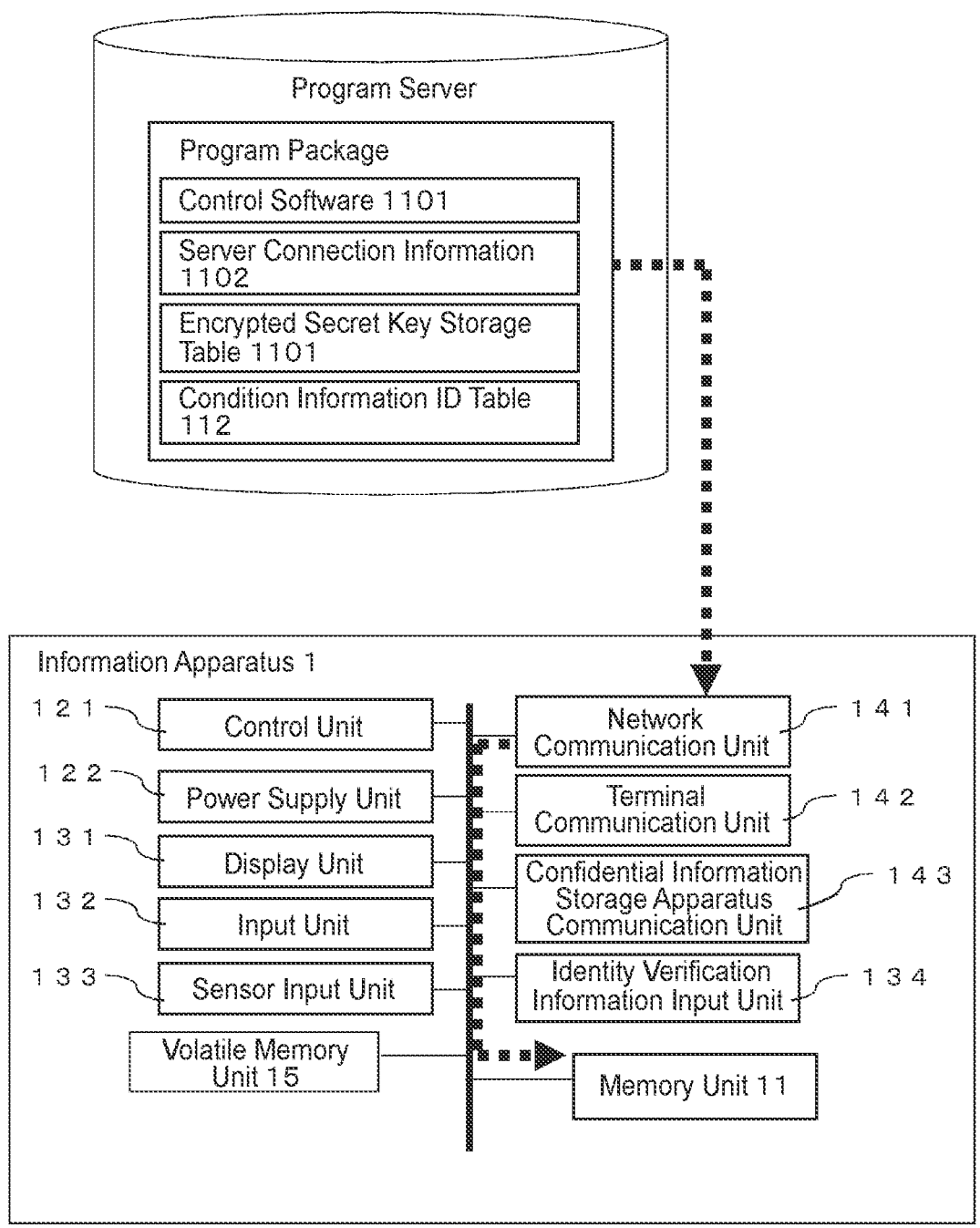
FIG. 21 is a diagram illustrating an example of a functional configuration of the information apparatus.

Furthermore, each of the aforementioned configurations, functions, processing units, processing means, etc. may be implemented by hardware by, for example, designing part or all of such configurations, functions, processing units, and processing means by using integrated circuits or the like. Moreover, each of the aforementioned configurations, functions, etc. may be realized by software by processors interpreting and executing programs for realizing each of the functions. Information such as programs, tables, and files for realizing each of the functions may be retained in memories, storage devices such as hard disks and SSDs (Solid State Drives), or storage media such as IC cards, SD cards, and DVDs. Incidentally, the programs or the like for implementing each function may be duplicated in the server or the like and may be provided to the information apparatus 1 and other terminals, apparatuses, and equipment via wired or wireless communication lines as illustrated in FIG. 21. In this case, the user operates the terminal or the like to download necessary programs or the like from the server or the like and installs them onto a memory unit for the terminal or the like.

Furthermore, control lines and information lines which are considered to be necessary for the explanation are illustrated; however, not all control lines or information lines are necessarily indicated in terms of products. Practically, it may be assumed that almost all components are connected to each other.

REFERENCE SIGNS LIST

1: information apparatus
2: confidential information storage apparatus
3: terminal
4: server

The invention claimed is:

1. A confidential information setting method for setting confidential information to a terminal by using a server, a user apparatus, and a confidential information storage apparatus,
   wherein the user apparatus executes method steps, comprising:
   acquiring an encrypted secret key from a memory unit of the server; and
   acquiring a terminal ID, which is an identifier for uniquely identifying the terminal, from the terminal, and
   wherein the confidential information storage apparatus executes method steps, comprising:
   acquiring an encryption key and condition information, which is a condition for setting the secret key to the terminal, from the memory unit of the server;
   acquiring the terminal ID and the secret key, which is associated with the terminal ID and encrypted, from a memory unit of the user apparatus;
   decrypting the encrypted secret key with the encryption key;
   determining whether the decrypted secret key can be transmitted to the terminal based on the condition information; and
   transmitting the secret key to the terminal upon determining a result of the judgment indicates that the secret key can be transmitted to the terminal.

2. The confidential information setting method according to claim 1,
   wherein the condition information includes information for designating a method for connecting the user apparatus and the terminal; and
   wherein when the terminal is connected to the user apparatus by the designated connecting method, the judgment is made to determine that the secret key can be set.

3. The confidential information setting method according to claim 1,
   wherein the condition information includes information for designating a positional range; and
   wherein when at least either one of the user apparatus and the terminal exists within the positional range, the judgment is made to determine that the secret key can be set.

4. The confidential information setting method according to claim 1,
   wherein the condition information includes information for designating a time slot; and
   wherein when time when the judgment is performed is included in the time slot, the judgment is made to determine that the secret key can be set.

5. The confidential information setting method according to claim 1,
   wherein the condition information includes information for designating an approver; and
   wherein when information for identifying the designated approver by a specified method is input, the judgment is made to determine that the secret key can be set.

6. The confidential information setting method according to claim 1,
   wherein the condition information includes information for designating the terminal; and
   wherein when information for identifying the designated terminal by a specified method is input, the judgment is made to determine that the secret key can be set.

7. A system for setting confidential information, comprising:
   a server, a user apparatus, and a confidential information storage apparatus,
   wherein the server includes a memory unit that stores an encrypted secret key, an encryption key, and condition information which is a condition for setting the secret key to a terminal;
   wherein the user apparatus includes:
   a communication unit that acquires the encrypted secret key from the memory unit of the server and acquires a terminal ID, which is an identifier for uniquely identifying the terminal, from the terminal; and
   a memory unit that stores the acquired information; and
   wherein the confidential information storage apparatus includes:
   a communication unit that acquires the encryption key and the condition information from the memory unit of the server and acquires the terminal ID and the secret key, which is associated with the terminal ID and encrypted, from the memory unit of the user apparatus;
   an encryption processing unit that decrypts the encrypted secret key with the encryption key; and
   a control unit that determines whether the decrypted secret key can be transmitted to the terminal based on the condition information and transmits the secret key to the terminal upon determining a result of the judgment indicates that the secret key can be transmitted to the terminal.

* * * * *